(12) United States Patent
Phillips

(10) Patent No.: US 12,378,872 B2
(45) Date of Patent: Aug. 5, 2025

(54) WELLBORE FRICTION MEASUREMENT, METHOD AND APPARATUS

(71) Applicant: Walter Phillips, Huntington Beach, CA (US)

(72) Inventor: Walter Phillips, Huntington Beach, CA (US)

(73) Assignee: Walter Phillips, San Diego, CA (US)

( * ) Notice: Subject to any disclaimer, the term of this patent is extended or adjusted under 35 U.S.C. 154(b) by 8 days.

(21) Appl. No.: 18/045,916

(22) Filed: Oct. 12, 2022

(65) Prior Publication Data

US 2023/0073307 A1    Mar. 9, 2023

Related U.S. Application Data

(63) Continuation of application No. 16/946,232, filed on Jun. 11, 2020, now Pat. No. 11,525,351.

(51) Int. Cl.
| | | |
|---|---|---|
| *E21B 47/007* | (2012.01) | |
| *E21B 19/00* | (2006.01) | |
| *E21B 47/09* | (2012.01) | |
| *G01N 19/02* | (2006.01) | |

(52) U.S. Cl.
CPC ............ *E21B 47/007* (2020.05); *E21B 47/09* (2013.01); *G01N 19/02* (2013.01); *E21B 19/00* (2013.01)

(58) Field of Classification Search
CPC .............................. G01N 19/02; E21B 47/007
See application file for complete search history.

(56) References Cited

U.S. PATENT DOCUMENTS

| | | |
|---|---|---|
| 3,216,245 A | 11/1965 | Seed |
| 3,343,409 A | 9/1967 | Gibbs |
| 3,355,938 A | 12/1967 | Neely |
| 3,457,781 A | 7/1969 | Elliott |
| 4,583,915 A | 4/1986 | Montgomery |
| 4,947,936 A | 8/1990 | Ellwood |
| 5,182,946 A | 2/1993 | Boughner |

(Continued)

OTHER PUBLICATIONS

Downhole Measurement on Pumping Oil Wells G.D. Albert, Magnetic Peripherals Inc.; J.C. Purcupile, * U. of Oklahoma; and J.C. Chacin U, Intevep S.A. SPE 17010 SPE Production Technology Symposium, held in Lubbock, Texas, Nov. 16-17, 1987.

(Continued)

*Primary Examiner* — Daniel J Colilla

(57) ABSTRACT

An apparatus and method for measuring position and magnitude of downhole mechanical friction. The apparatus comprises sensors that reside along, or in-line with, a section of equipment that is installed or removed from a wellbore. The sensing device is configured to measure friction relative to the wellbore during a work-over or other well intervention procedures where said section of equipment (tubing, rods, cable/wireline, etc.) is installed in, or removed from, the wellbore. Recorded measurements are processed to correct for dynamic forces to provide a measure of friction through the wellbore. Additionally, a method for applying the map of wellbore friction to the design and analysis of a rod actuated pump is presented. The method and apparatus presented herein pertain specifically to the handling of continuous rod, continuous tubing, or wireline/cable passing through the wellbore as measured at surface.

20 Claims, 13 Drawing Sheets

(56) References Cited

U.S. PATENT DOCUMENTS

| | | | |
|---|---|---|---|
| 5,252,031 | A | 11/1993 | Gibbs |
| 5,464,058 | A | 11/1995 | McCoy |
| 8,306,676 | B1 | 11/2012 | Ingvalson et al. |
| 8,566,032 | B2 | 10/2013 | Chowdhary et al. |
| 8,849,594 | B2 | 9/2014 | Mills |
| 9,810,214 | B2 | 11/2017 | Pons |
| 9,939,264 | B2 | 4/2018 | Barfield et al. |
| 9,983,076 | B2 | 5/2018 | Zhao |
| 10,018,032 | B2 | 7/2018 | Pons |
| 10,260,500 | B2 | 4/2019 | Qi |
| 10,815,770 | B2 | 10/2020 | Moreno |
| 11,021,946 | B2 | 6/2021 | Puls et al. |
| 2018/0045032 | A1 | 2/2018 | Suermondt et al. |
| 2019/0178059 | A1* | 6/2019 | Zheng ............... E21B 47/00 |
| 2019/0203579 | A1 | 7/2019 | Phillips |
| 2019/0257176 | A1* | 8/2019 | Dykstra ............. E21B 19/00 |
| 2020/0263531 | A1 | 8/2020 | Fyfe |
| 2020/0355063 | A1* | 11/2020 | Van Vliet ............ G06G 7/48 |
| 2020/0386092 | A1 | 12/2020 | Phillips |
| 2021/0115914 | A1 | 4/2021 | Zhao |

OTHER PUBLICATIONS

An Oil-Well Pump Dynagraph Walton E. Gilbert API-36-094 Drilling and Production Practice, Jan. 1, 1936.

A Numerical Approach to the Diagnosis of Sucker Rod Pumping Installations and Its Verification With Downhole Pump Field Measurements J.E. ChacIn, Intevep S.A. SPE 18829 SPE ProduorionOperations Sympoaiimrheld In Oklahoma City, Oklahoma, Mar. 13-14, 1989.

Insights From the Downhole Dynamometer Database John R. Waggoner SAND97-0223C https://www.osti.gov/servlets/purl/456351.

New CD-ROM available free from Sandia National Laboratories reveals nitty gritty details of downhole oil well environment https://www.sandia.gov/media/dynamo.htm.

Downhole Dynamometer Tool Glenn D. Albert Proceedings of the Forty-First Annual Meeting of the Southwestern Petroleum Short Course, Lubbock, TX, Apr. 20-21, 1994.

Fyfe U.S. Appl. No. 62/557,627.

* cited by examiner

WELLBORE FRICTION MEASUREMENT, METHOD AND APPARATUS

This application is a continuation of U.S. Ser. No. 16/946,232 which is included by reference. This application focuses on applying the method and apparatus to continuous rod, continuous tubing, wireline or cable, as it is installed in, or removed from, a wellbore.

A further means to correct barometric pressure readings for height determination is presented. This has direct applications in U.S. Ser. No. 16/946,232 as well as broader application in monitoring operational pumping wells. The dual pressure barometric sensor configuration presented may be applicable other lifting activities such as crane and rigging operations.

Section headings are provided to denote text added since U.S. Ser. No. 16/946,232. Added text may not strictly represent new material in all cases. The applications in continuous rod and tubing were introduced in U.S. Ser. No. 16/946,232 paragraphs [0017], [0029], and [0052]. The added text regarding continuous rod, tubing, and wireline/cable, in the current application expands on this concept without adding substantial new material over U.S. Ser. No. 16/946,232. The synchronized dual barometric pressure sensor for measuring vertical height is new material.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of hydrocarbon recovery operations. More specifically, the present invention relates to the production of fluids to the surface using rotational or reciprocating rod actuated artificial lift. The invention also relates to an apparatus for measuring downhole mechanical friction in a wellbore, and a method for utilizing that friction knowledge to improve well operations.

TECHNOLOGY IN THE FIELD OF THE INVENTION

To prepare a wellbore for the production of hydrocarbon fluids, a string of production tubing is run into the casing. The production tubing serves as a conduit for carrying production fluids to the surface. A mechanically actuated downhole pump is installed at the bottom of the tubing. A rod-string, extending from surface, is attached to the downhole pump. The rods are then actuated at surface to lift fluid from the downhole pump, up through the tubing, to surface.

The production of hydrocarbon fluids using a sucker rod pump, or a progressing cavity pump, creates friction and wear as the rods reciprocate up and down, or rotate, within the production tubing. Those of ordinary skill in the art will understand that most wells are not perfectly vertical but can have path deviations. Such deviations may be in the form of a gentle corkscrew created as a largely unavoidable result of forming the wellbore using a rotating drill pipe and bit. Other such deviations may be intentional to reach reservoirs from a specific surface location. These path deviations cause the rods to be deflected into the tubing, which causes friction and wear. Friction and wear have serious adverse effects on the operation of rod actuated wells. Directional or horizontal wells are increasingly common and present difficulties, with respect to friction, when producing via a rod or progressing cavity pump.

The presence of wellbore deviations can impart a sideload on the rod-string, resulting in friction and wear at points of wellbore deviation. In order to accurately diagnose the performance of a rod actuated well, it is desirable to thoroughly understand the friction present in the given well. Likewise, a detailed understanding of the friction present can help to better design the downhole assembly.

Oil and gas wellbores are drilled in a manner that results in intentional, or unintentional, path deviations. Wellbores are surveyed by obtaining "instantaneous" trajectory information at various depths. These distinct trajectory measurements are then computed to spatial coordinates, from which the overall wellbore path through 3-dimensional space is indirectly calculated. There are errors inherent in this surveying process, but for overall wellbore placement and location, this general method suffices. In a rod (or progressing cavity) pumped well, the steel or fiberglass rods slide through production tubing, which itself is placed in the wellbore, further introducing subtle path deviations.

Survey methods through the axial centerline of the wellbore may differ slightly from the actual path of the rods when placed in casing and further inside of the production tubing. Furthermore, the true path through 3-dimensional space may be more complex than can be obtained through instantaneous tangential measurements taken at coarsely spaced intervals. Drilling surveys generally do not provide high enough resolution to identify subtle and localized path deviations that influence rod-on-tubing friction. Alternatively, high resolution post-drill gyro surveys present a significant improvement but are still susceptible to compounding measurement or calculation errors and may not be accurate enough to thoroughly determine contact points from the calculated path. Post-drill surveys also require the well to be taken off production while the work is preformed, which adds to the overall cost of such a survey. These survey methods still result in an indirect, and potentially inaccurate, calculation of downhole friction.

Wellbore surveying, for the purposes of geometric representation, is done by sampling the directional components at several locations in the wellbore. These are the horizontal component of direction, known as "azimuth" or compass heading, and the vertical component of "inclination", or the angle from true vertical. The composition of the horizontal and vertical angles gives a direction in 3-dimensional space. The distance between the adjacent samples is directly measurable along the wellbore and is referred to as "measured depth". The samples, or survey locations can then be converted to Cartesian coordinates through several mathematical approaches. Of note is that these mathematical models assume a large smooth semi-circle between adjacent samples. Furthermore, the absolute Cartesian coordinates are reliant on previous calculations, meaning that any errors in the survey measurements, or "smooth circle" assumption, will compound with increasing depth. These errors are tolerable for overall wellbore placement where errors of a few feet are acceptable. These errors become problematic when used to determine precise and detailed deviations, on the scale of inches or less, that cause rod-on-tubing friction.

Wellbore path deviations create rod on tubing contact, resulting in friction at distinct points along the rod-string. Spatial coordinates derived from the wellbore surveys are used to identify these frictional contact points. A side-load value is further calculated from rod tension, which varies with depth, dynamic forces, and friction present elsewhere along the rod-string. The fundamental flaw in existing methodologies is that friction values necessary for equipment performance analysis are derived from indirectly calculated geometry, not by direct measurement of that friction. Wellbore geometry is derived from trajectory samples composed of azimuth and inclination, which may be flawed, or may differ slightly between casing, tubing, and rod paths. Any errors in the measurements or the multi-step calculation process can compound, resulting in incorrect friction and side-loading values. Furthermore, the interaction between tension, gravity, and wellbore geometry is not thoroughly understood from these survey methods. A more direct method of measuring actual wellbore friction is needed.

Continuous Rod, Tubing, or Cable/Wireline

Typical sucker rods are installed in individual sections, threaded onto the larger rod-string. These individual sections are commonly referred to as "stick-rods" as they resemble a bundle of sticks, typically 25 ft or 30 ft in length. These rods are installed in discrete sections into the wellbore; lifted or lowered as a single unit, repeated as each rod is added or removed. Another type of rod-string is continuous rod, which is spooled and deployed in one continuous section into the well using special handling equipment. Once deployed, the continuous rod-string is functionally equivalent to a rod-string made up of individual sections of rod. As the continuous rods lack threaded connections, their contact and frictional properties may differ from a traditional stick-rod rod-string. Continuous rod can be round or oval shaped. Oval shaped rods also may have different frictional and rod-on-tubing contact properties relative to round continuous or round stick-rods. It is desirable to quantify the friction present on such rods through direct measurements as inferred contact points from wellbore geometry is insufficient for quantifying frictional forces.

Continuous rods, continuous tubing, and wireline/cable are all very similar in terms of traveling though the wellbore. The terms continuous rods, continuous tubing, and wireline/cable should be understood to be conceptually similar and interchangeable for this disclosure. The term "equipment" may be substituted for brevity and is intended to mean any long slender material deployed downhole through the wellbore. Continuous tubing is often referred to as "coiled tubing". Continuous rod, tubing, wireline or cable, are a contiguous length of material with known properties and are installed in the wellbore by some external mechanical system. This external lifting/lowering system is temporary, and located at surface. This lifting/lowering system can be a dedicated piece of equipment such as a wireline truck that has a large spool of cable and drive system. In the case of continuous rods, the rig may be a full-service rig configured for continuous rods, or it may be a distinct piece of equipment used in conjunction with a traditional workover rig. In all cases, the measurement of load and the measurement of the length of rod, tubing, or cable deployed can be obtained at surface through suitable sensing devices placed on or near this lifting/lowering system. Of particular note is the relative movement of a continuous section relative to the lifting system and wellhead. This continuous material is handled from a stationary point, whereas stick-rods are handled by moving the entire section in one unit.

Continuous rods are typically deployed in a manner that utilizes gravity to pull the rods down as their purpose is to actuate a downhole pump, either a traditional rod pump, or a progressing cavity pump. In the case of continuous tubing or cable/wireline operations, the tubing or cable/wireline may be deployed through a significant horizontal or upwardly inclined section of wellbore. Often mechanical "tractors" are used to assist "pulling" the tubing through the sections where the downhole end of the tubing or cable/wireline is pulled via the downhole tractor moving through the wellbore. In such cases wellbore friction is a critical component for sizing the tractor. Wellbore geometry is often sufficient to determine this sizing within an order of magnitude. In other words, wellbore geometry is used to "predict" the expected friction. The purpose of this disclosure is to more accurately measure this friction through direct measurements.

Continuous rod handling equipment falls into 2 general categories; a dedicated full-service rig, or a separate "injector" that is used in conjunction with a traditional service rig. The continuous rods are directed from a truck mounted spool over a gradual guide placing the rods in a vertical orientation just above the wellhead. The injector grips the rod using a set of grippers that resemble a military tank or Caterpillar treads and allow the rods to be progressively driven into or extracted from the wellbore. The grippers are typically hydraulically actuated which affords a great deal of control over the velocity and load dynamics of the rods in the system. A traditional stick-rod operation starts and stops on each section of rods, resulting in highly dynamic load and position variations. Continuous rod (and tubing or wireline/cable) can start or stop at any point, but are typically moved from beginning to end in one motion.

The continuous rod affords an opportunity to achieve a constant velocity over a long section of rods. While a constant velocity is not a requirement, as described in U.S. Ser. No. 16/946,232, it presents a unique set of conditions that can be observed and correlated to friction relative to depth. The simple analogy is standing on a bathroom scale in an elevator. If the elevator is moving at a constant velocity, the scale reading is an accurate reflection of mass. If the elevator is accelerating, the scale reading will be inaccurate with respect to the mass on the scale. U.S. Ser. No. 16/946,232 addresses this dynamic motion through the use of the wave equation which explicitly removes this acceleration induced force. The same mathematical method can be applied to continuous material moving dynamically in the wellbore. Constant velocity is not a requirement but can be achieved for an extended period with continuous rods.

The general approach of high resolution, high frequency, load and position measurements on traditional stick-rods, wireline, a traveling downhole tool, and continuous rod or tubing is identical. The specific means to obtain the necessary measurements and to process the measurements into a useable friction map of the wellbore differ. U.S. Ser. No. 16/946,232 presents a sensing device that moves with the entire length of equipment, without changing length during the motion. The present disclosure provides a stationary sensing device that allows, and measures, changing length of equipment deployed downhole.

Barometric Pressure Synchronization

Barometric pressure sensors are used in altimeters (which is a barometric pressure device). Unfortunately, overall atmospheric pressure is subject to changes over time. This is a known problem in aviation and to correct for this drift, a second stationary barometric pressure sensor is introduced at a fixed location and elevation. Pressure readings from this stationary location are transmitted to aircraft which can then adjust their altimeter for the "ground" pressure value which corresponds to the known altitude of that fixed point. Such a pressure correction scheme is not used for determining above-ground height in oilfield applications. There may be applications in general lifting such as cranes or other non-aviation applications for a synchronized pressure sensor to determine height.

In particular, a running pumping unit, or "pumpjack" can benefit from a pressure drift compensated height to determine position of the polished rod during the stroke. Several methods exist for determining polished rod position. Gibbs U.S. Pat. No. 5,252,031A discusses a discrete sensor to trigger at a point during the stroke. Other methods utilize an accelerometer placed on the walking beam to act as an inclinometer, or an accelerometer placed on the polished rod. A polished rod mounted accelerometer requires some external reference to correct for measurement errors.

Inventions such as Zaho U.S. Pat. No. 9,983,076 B2 and Fyfe U.S. 62/557,627 utilize an accelerometer placed on the polished rod, often in conjunction with a load-cell, which travels vertically as the pumping unit strokes. An accelerometer alone is insufficient to accurately determine vertical position and so a secondary reference is introduced. This secondary external reference may be in the form of a switch that triggers at a known position, or an inclinometer placed on the walking beam. In U.S. Ser. No. 16/946,232 this external position reference is determined from the load transfer as the rods are added or removed, but this distinct load transfer is only available on a workover rig that is installing or removing equipment. A load transfer does occur in a pumping well, but it is not as distinct and, because the load-transfer occurs at the downhole pump, there is a significant time delay until it is felt at surface. The vertical position determined from a barometric pressure sensor can be used to improve position integrated from acceleration measurements. Both accelerometer-derived position and barometric pressure-derived position alone are subject to drift over longer time periods.

A drift compensated high accuracy barometric pressure sensor could provide a measure of polished rod position for a low power alternative to an accelerometer. A drift compensated pressure sensor could also be used in conjunction with an accelerometer to provide a substantially more accurate position measurement during the stroke of a traditional pumping unit.

Barometric pressure sensors are extremely power efficient relative to accelerometers. This is of importance to an operational well where the sensor must be battery powered as it is moving vertically, yet run 24/7 for years. An Infineon DPS310 pressure sensor draws approximately 38 µA, whereas an ADXL203 accelerometer disclosed by Zaho draws approximately 700 µA. The pressure sensor may not necessarily replace an accelerometer in such applications, but it may allow the accelerometer to run at a reduced power consumption while achieving an accurate and improved combined accelerometer-pressure derived position value.

Applications such as Zaho and Fyfe transmit measurements wirelessly from the moving sensor, to a stationary device, that can act on the determined load and position values in the context of well pumping operation. This stationary device provides an opportunity to include a secondary pressure sensor, at a fixed location, for improved drift compensation. Furthermore, since measurements are transmitted from the battery powered sensor, the pressure offset and position calculations can be performed on the stationary device which is externally powered and not power-constrained.

Realtime Display

Drilling rigs have advanced sensors and display capabilities. A traditional service rig has very few instruments available to the operator. A mechanical weight indicator is typically place on the cable to provide a load measurement and display for the rig operator. Typically this is only available on a deadline cable, or the end of a lifting cable line that is held stationary, while the other end of the cable is wound around the drum for lifting. In some rig configurations both cable ends are wrapped around the drum. This increases the operating speed of the rig but sacrifices the load indication as the cables are fully in motion. In this configuration the rid is "doubled". In such a configuration the workover service crew has no indication of hook-loads beyond feel and experience. This can be a very dangerous operation for an inexperienced operator.

In some cases, an accurate indication of load can be very useful during the workover process. For example, when the rods are stacked out on the bottom of the well (or tubing), it is helpful to know the point when the rods are fully picked up. A skilled operator typically does this by feel, but that can be an error-prone process and highly dependent on the operator. A mechanical load indicator only presents an instantaneous load which may fluctuate. In many instances it would be useful to see a visual plot of loads over time to observe when hook-load stabilizes.

It is advantageous to provide immediate measurements of load, both instantaneous and a trailing plot of recent loads over time, handling statistics like peak and average velocity, vertical position of the lifting assembly, length of equipment deployed in the well, etc. in a unified interface. This is available on instrumented drilling rigs, but most service rigs have very little installed sensing capability. It is desirable to provide such operator feedback with a minimal installation requirement.

A stationary display of such information, in communication with the moving sensor, is an ideal placement for a stationary barometric pressure sensor to correct for atmospheric pressure drift discussed above. This display can provide a dual function of visual presentation of the measurements, as well as to capture and communicate the stationary pressure measurements to the moving sensor, or receive pressure measurements from the moving sensor. A wireless connection is not strictly required but is the most appropriate means to synchronize this data between the display and moving sensor.

BRIEF SUMMARY OF THE INVENTION

Errors in the wellbore positional survey result in errors in the frictional model derived from that survey. A need exists to provide a direct measurement of friction in the wellbore that approximates or replicates actual pumping conditions. A method and apparatus are presented that can measure friction, both directly and at a distance, in a wellbore. Knowledge of wellbore friction can guide the selection of downhole components to address this friction. Additionally, a better understanding of downhole friction can improve the design and analysis of pumping wells.

Well servicing, including work-over (installing and removing the rods and/or tubing), wireline operations, drilling, etc., probe out the wellbore with lengthy physical equipment that is mechanically attached to some surface mechanism. Of importance is the lengthy equipment sliding through the wellbore, exposed to friction caused by path deviations. In some respects, the work-over process is similar to the concept of a rod pumped well, where a length of steel rods is mechanically attached to a surface pumpjack, extending all the way to the downhole pump. There are however some distinct differences, for example the lack of a cyclic loading, and the nature of installing or removing equipment significantly differs from normal pumpjack operation. Work-over service rigs also differ from pumpjacks in the lack of specific instrumentation necessary to gather measurements during normal operations to perform the calculations for identifying downhole conditions. Still, the work-over process affords an opportunity to observe friction acting at varying depths as equipment is installed or removed, which is not possible in a pumping well configuration.

Effectively measuring the friction due to varying tension during these work-over or wireline processes can provide a map of the wellbore friction. This more closely approximates the operating well conditions than the calculated, and inferred methods based on wellbore geometry through directional surveys. Furthermore, these work-over or wireline operations already take place at various times during the life of a well. A sensing device to take measurements during these operations and a method to process the gathered data from that operation can identify friction at depths along the wellbore.

Dynamic conditions during the process of handling rods, wireline, continuous rods or continuous tubing, complicate the measurement because actual loads are obscured by accelerations and stretch of the material (rods, tubing, or cable/wireline) between the point of measure, and any other point along the rod or cable. Fortunately, a method for dealing with these dynamic conditions exists in the operation and diagnostics of running rod pumped wells. This method was pioneered in the 1960's by Sam Gibbs (U.S. Pat. No. 3,343,409) and is commonly known as the Wave Equation. The wave equation is a broad mathematical method that can apply to many fields. As it pertains to rod pumped wells specifically, the method is used to analyze (or to predict) a single stroke of the pumping unit. Using measured surface load and position data, this method calculates the conditions at the bottom of the rod-string by eliminating dynamic conditions in the system such as accelerations, rod stretch, viscous fluid damping, etc.

The wave equation method, as currently used in the industry, does not sufficiently handle mechanical sliding friction such as rod-on-tubing contact. Gibbs points out that any errors in the friction model will be present in the resulting calculated load and position values at the far end of the rod-string. This is known as the Gibbs Conjecture. In practice, when the wave equation is applied to analyzing wells with friction, the resulting analysis includes, but does not identify, that friction in the resulting load and position values at the far end of the rod-string. Unaccounted friction distorts the analysis, as these calculated loads and positions are not truly felt at the far end of the rod-string (i.e. the pump). Distortion in the calculated downhole conditions makes analysis difficult, and in some cases impossible. It is therefore desirable to account for this friction to both analyze downhole conditions and understand where to address contact points along the wellbore.

The phenomenon of friction being carried along in the calculations as the "Gibbs Conjecture" shows can be used to our advantage if multiple data sets can be obtained at varying depths. In other words, if the frictionally exposed rods were varied in length to experience friction over different sections of the wellbore. Fortunately, just such a procedure to "probe out" the well bore at varying depths already takes place during work-over operations where the rods (or tubing) are removed or installed in the wellbore. Sections of rods (or tubing) are sequentially pulled out of (or installed in) the wellbore. This is similar to the "stroking" action that takes place in an operational rod pumped well, although the stroke does not cyclically return to the same starting position, as equipment is being installed or removed. Nevertheless, the stroking action of the work-over rig can be processed with a modified Wave Equation implementation to suit the different mode of a work-over compared to an operational/pumping well. Subsequent "strokes" of the rods can then be compared with differing lengths of wellbore contact to uncover friction acting at different depths.

The act of pulling or installing rods results in a partial "stroke" where the rods travel in one direction and then stop while the rig crew reconfigures the tooling for the next "stroke". When pulling rods, the rig "up-strokes" the rods. Likewise, when installing, the rig "down-strokes" the rods. In an operational well a single stroke involves both an upstroke and a down-stroke where the surface stroke oscillates between a fixed maximum and minimum position. From a mathematical perspective, the direction of the stroke, or "completeness" of the cycle is largely irrelevant, only that a enough data, at a sufficient sample rate, is obtained for the calculations to stabilize.

The rig operation also differs from a typical operational well, as there is no cyclic fluid load applied to the far end of the rod-string by way of pump action. Fortunately, an "unloaded" rod-string is a thoroughly understood condition. In a running well, this can manifest as a rod part (where the rods break at some depth) or if the pump valves become stuck open. In this condition, the load at the bottom of the rod-string is known to be zero because there is no external load applied by way of pump action lifting fluid on the upstroke. The rods are free to oscillate, like a hanging slinky, except for friction, which is what we wish to measure.

Utilizing the Gibbs conjecture, when we calculate the load and position at the bottom of the rods, non-zero calculated loads will indicate friction somewhere along the entire rod-string, although it is not yet known where that friction is acting, only the cumulative frictional effects are known. Downhole position, in addition to load, is also affected but is less of a concern in this scenario as we are primarily interested in identifying loads that are a result of friction along that exposed section of rods. Furthermore, frictional induced tensile loads are dependent on the normal force applied to the point of friction, which itself is a result of additional tensile loads due to friction that may be present below that point. We cannot, at this stage, identify where the friction is acting, or how substantial any specific frictional region is, only the cumulative affect over that length of rods under measurement.

To obtain friction measurements at all depths, the work-over operation removes a section of rods, and the calculation can be repeated based on the new shorter total rod length remaining in the wellbore. Again, friction present in the calculated data is acting somewhere along the rod-string, but this new value does not include friction in the lower wellbore section compared to the previous "sample". The rods have been lifted within the wellbore by a known amount and that equivalent number of rods has been removed from the top of the rod-string. This process can be repeated up (or down, when installing equipment) the wellbore for a measure of friction acting at different depths. In a perfectly frictionless wellbore, each calculated downhole load value (at each sampled depth) at the bottom of the rod-string would be zero. In a wellbore with distinct friction acting at a specific depth, the sequence of calculated load values for each rod section, following Gibbs Conjecture, would show changing load variation (from zero at the bottom of the rod-string) leading up to that depth where the distinct friction is acting. As the bottom of the rod-string passes the point of friction, that friction no longer can influence the calculations, and thus can be identified by a depth at which that frictionally induced load value diminishes.

Complicating factors such as partially filled tubing, causing varying rod buoyancy, can be corrected for through other means such as a fluid level survey. The rig crew can also be instructed to make multiple "strokes" at specified depths of interest to obtain more measured data to process. The rig crew can also be instructed to pull the rods in a prescribed fashion to further derive additional information about the wellbore and is discussed below. Because the sensing device is unobtrusive, the data can be gathered on each job where equipment is installed or removed. This means that multiple data sets can be obtained over the life of the well. These additional data sets can help increase the resolution and accuracy of the friction map derived by the method disclosed herein.

It is mostly assumed that wellbore paths do not change, but in practice, shifting conditions in the earth can alter the wellbore. An earthquake for example may introduce a new deviation in a wellbore that was not present when originally surveyed. While it is though to be rare, this type of condition does occur. The invention disclosed herein can help identify this condition and a decision to resurvey the wellbore can be made.

Predictive vs. diagnostic approach: The Wave Equation methods work both in the diagnostic (top down) form, and the predictive (ahead in time) form. There are 4 boundary conditions at play: Surface Load, Surface Position, Pump Load, and Pump Position. Pump load and position refers to the bottom of the rod-string. The diagnostic approach uses the 2 boundary conditions of Surface Load & Surface Position to calculate Pump Load & Pump Position. The diagnostic approach utilizes measured surface load and position. The predictive method, however, utilizes assumed (or predicted) surface position and estimated pump load based on the fluid properties to calculate the remaining conditions of surface load, and pump position.

Given the knowledge that the load at the far end (bottom) of the rod-string while installing or removing rods, is zero, a predictive data set based on the surface motion and zero downhole pump load can provide a dynamic comparison of predicted vs. measured surface loads. The predicted surface loads include no friction, whereas the measured surface loads (measured on the work-over rig by the apparatus discussed below) include friction acting along the rods currently in the hole. These predicted and measured surface loads can be compared again to obtain a friction map along the wellbore. Comparing predicted and measured loads in this way includes dynamic loads. Again, the rig crew can be instructed to pull the rods in a manner that minimizes the dynamic loading to uncover additional information and is discussed below. Pulling the rods very slowly at a constant speed would accomplish this. This does not have to be done over the entire work-over process, but can be done periodically, or at specific depths of interest. Load and position gathered during normal (fast) rig operations should suffice. The "slow pull" is an optional procedure that can achieve additional measurements but is not required.

A "slow pull" procedure could be adapted to a pumping well configuration by utilizing a variable frequency drive (VFD), sometimes referred to as a variable speed drive. The important distinction between implementing a slow pull on a pumping well compared to a work-over service rig is that the pumping well can only probe out a single length, namely the entire rod-string. While it is possible to identify multiple distinct friction locations in such a configuration, it is more likely that only the most severe friction point would be identified. The work-over configuration, however, allows for multiple depths to be tested, and thus multiple friction points may be identified. An automated slow-pull procedure on a pumping well may beneficially identify changing downhole friction, which itself may indicate impending failure, or if caught early enough, may prescribe mitigating factors such as chemical based lubrication or corrosion inhibitors. Increasing friction may also be an indication of a failed rod rotator mechanism.

Static and dynamic friction: Much of the above discussion involves the assumption of dynamic friction; that is friction acting on a moving body. Static friction acts on a body at rest and because of rod stretch and dynamic conditions, the local velocity at a given depth may be different from that at surface. This static-to-dynamic friction transition typically only manifests as an observable load variation at surface when the rods are moving substantially slowly. This is not always possible in an operating rod well as the stroke speed is dictated by mechanical equipment and pump action drastically varies applied load. A work-over rig can pull the rods very slowly, which presents an opportunity to measure static and transitional friction (also referred to as Stribeck friction) acting at a specific depth by observing load increases corresponding to a load vs. position plot that is a result of the elasticity of a distinct section of rods present between the point of measure and the frictional resistance.

In a frictionless well, when pulling the rods very slowly and at a constant rate, the measured loads should not vary. In a case where static friction is acting at a depth, the measured loads will increase at surface, if the rods are held by friction downhole at a specific depth. That load increase is directly related to the rod stretch between these points and can be backwards calculated to a depth (or total rod length) using Hooke's law. The magnitude, or severity, of that friction can be obtained from the height of a "stretch" plot obtained by this surface load vs. position data as the rods stick and slip at some point downhole.

When the tension overcomes the restriction caused by a static downhole friction point, the downhole section of rods will begin to move, and the friction will transition from static to dynamic. This depth can then be obtained at surface by observing the load increase over a corresponding elongation, and applying Hooke's law to determine the corresponding elasticity constant, which in turn corresponds to a specific length of steel rods (i.e. corresponding to a specific depth from surface). The rig crew can be instructed to periodically perform a "slow pull" at specific depths to obtain detailed measurements pertaining to static friction. Provided enough onboard processing capacity of the sensing device, the results of this "slow pull" can be immediately reported to the rig operator. Gathered data may be processed on-site, or post-processed offsite after the work-over is completed. Again, the common case is to perform the work-over as normal and process the dynamic data. This "slow pull" procedure, however, is an additional option that can be interleaved strategically to obtain additional static data that is otherwise unobtainable.

Additional discussion, alternate methods: The method discussed above deals with traditional work-over methods where a distinct section of rods is physically removed (or installed) and repeated. Existing implementations of the Wave Equation assume a fixed rod weight and length during a given stroke. In other words, the rod length and weight does not change during the algorithm, as currently implemented and understood in the industry. This fits nicely with the work-over operation where the Wave Equation inputs only need to be updated between each subsequent and distinct "stroke" rather than constantly during the dynamic phases of that entire process. This requires only minimal modifications to existing computational methods. Other operations such as wireline, sand-line, or continuous rod, add or remove material continuously. In other words, when running a wireline downhole, the length and weight, as seen from surface, is continually changing, as is the elasticity of the entire section. The wave equation algorithm can be modified to account for this added complexity but is a substantial change to existing implementations and assumptions. The general method of observing surface load and position can therefore be applied to any operation that installs or removes lengthy equipment in the wellbore. This includes continuous rods, continuous tubing, drill pipe, cable, etc. in addition to standard fixed-length sucker rod or tubing sections.

The discussions above involve obtaining load and position measurements at surface, but this can be applied anywhere along the rod-string or wellbore. In particular, a load-cell can be attached to some weight and run down the wellbore, gathering load samples along the way. This is similar to the discussion above where load measurements are taken at surface. With a downhole tool, the measurements are taken closer to the potential source of friction. Dynamic effects such as rod-stretch are less significant in this case, as the distance between the friction source and measurement is reduced. The location and magnitude of friction points can be more precisely identified in this configuration. Multiple readings from both surface and downhole tools can be obtained and synchronized to provide a more accurate view of wellbore friction.

The general procedure for measuring load and friction in a traveling downhole device is to attach some lengthy section of weights that approximate a section of rods. In fact, the rods themselves can be used. An example would be to use 100 ft of 1.5-inch sucker rods suspended below the downhole tool, which would register approximately 1200 LBS as seen by the sensing device. The wireline, or sand-line, etc., would be attached to the top of the sensing device. The assembly would then be run downhole while the sensing device load and position (or distance traveled/depth) are logged. In a perfectly vertical, frictionless well, the weight of that 100 ft section is approximately 1200 LBS. If pulled at a constant speed, in the absence of friction, the weight seen by the downhole sensing device would be 1200 LBS. Dynamic accelerations of that mass will vary the load recorded, but that dynamic measured load can be corrected for and normalized with corresponding time synchronized positional data. Any friction encountered by that 100 ft section will vary the load but cannot be corrected for given acceleration data. Therefore, comparing the ideal loading against measured load readings (normalized for dynamic motion) while traveling along the well-bore, can indicate the location and relative severity of the friction. The length and weight of the traveling rod section can be selected to better measure the effects of friction in a given wellbore geometry. A longer section may be optimal if the interaction between multiple friction points is of interest. The entire rod length is one such case and is discussed above when measured from surface. The general concept of measuring load at the top of a rod or tubing section is identical; the specific implementation of the measurement apparatus may vary due to external physical and mechanical constraints.

A further addition to the traveling downhole load measurement is that a rod section can also be placed above the measuring device. This can aid in determining compressive loads caused by friction when traveling downhole. This compressive loading is generally only present when traveling down the wellbore. As the lower rod section encounters a frictional resistance, an upward force is created and may even cause the rods to stack out. The upward force caused by that friction is then registered either as a reduction in load, or a compressive load if the friction is significant enough to restrict the fall of the assembly. This is because the weight of the rods above is partially applied to the load-cell, as opposed to being strictly held in tension. Tension, reduction in tension, or compression can be measured on the load-cell incorporated in the downhole tool and correlated to a frictional resistance at a specific depth.

Position of the traveling downhole tool is necessary and critical. This can be obtained either directly on the tool itself by way of a physical measurement such as a rotary encoder traveling along the tubing or casing wall, or by a magnetic sensor to count couplings present in the wellbore. If an accelerometer is also placed in the traveling downhole tool, this can also be used to determine position. In fact, the accelerometer in the tool can also be used to determine inclination angle of the tool, which is a component of the overall deviation survey. Deviation surveys consist of both a compass heading and an inclination angle. Because the device is in a steel tube, the magnetic compass heading is difficult to sufficiently determine without the use of a high precision gyroscope or complex in-place calibration procedures. The general inclination angle of the tool is sensed by gravity or by the inertia of the tool and is unaffected by external equipment in the wellbore. This inclination measurement can help supplement existing deviation surveys and is a convenient byproduct of the traveling downhole load and position data logger.

The position of the traveling tool can also be obtained by synchronous readings at surface. The means for obtaining position are a primary distinction between the surface and downhole tool configurations, but the overall methodology for determining friction is the same. Under dynamic conditions, wave equation methods can be applied to the cable to determine more precisely where the tool is at the far end of the cable/wireline. The synchronized surface measurements can be combined with acceleration or positional data gathered on the moving tool (sensing device) to more precisely determine the absolute position of the tool and load readings during its trip through the wellbore. Another means for obtaining downhole position on the tool is to incorporate one or more magnetometers to sense tubing or casing collars. This can help correlate absolute position within the wellbore but can also be used to determine a velocity of the tool as it passes a collar. The values of velocity and position can then be utilized to (re)calibrate an accelerometer through the double integration of acceleration to velocity to position discussed below.

Apparatus to obtain surface data: Work-over service rigs are not generally instrumented with the necessary acquisition and logging equipment necessary to perform these calculations. This is because the work-over rig is a mechanical tool, and not generally regarded as a high-tech instrument. Additionally, the rig is a particularly harsh environment and achieving the high-frequency and high-resolution data acquisition requirements is challenging. A device does not currently exist that can sufficiently measure the detailed load and position needed to perform this friction analysis during a work-over.

There are several sensing components that can be integrated onto a work-over rig to measure load or position. A rotary encoder can be used to measure cable length, which can be used to determine position of the rods. The cable itself introduces a varying component of stretch. This is not an insurmountable problem, and so directly measuring position somewhere along the rig's cable system is one possible approach. External string potentiometers, or laser ranging systems could be used to determine position, but are likely to be damaged during "normal" rig activity. For load measurements, a cable deflection style load-cell can be integrated into the lifting system. In fact, this type of load measurement is present on many rigs. Unfortunately, measuring load on the cables this way is not always possible due to changing rig cable configurations. Cable deflection is also less accurate of a measure. A load measurement could be taken on the rig structure, or even torque on the draw-works drum, but these are generally not sensitive enough for the purposes of friction measurement. The apparatus to measure and log this data could utilize load and position measurements from any source, including (but not limited to) the ones listed above.

The preferred embodiment presented here utilizes an accelerometer and load-cell placed in line with the rod hook. This is determined to be the most convenient location from an integration standpoint, and since it is precisely at the point of interest it is also the most straightforward from a calculation and analysis perspective. Accelerometers present a unique challenge in that calculating position involves a double integration from acceleration to velocity, and then again to position. Any errors in this calculation compound over time. A critical observation in the work-over process is that the rod section being pulled is known and consistent for much of the operation. Furthermore, the load transition always occurs at the same place on the rig floor, as the remaining rods are hung from the wellhead. This load transition allows the accelerometer data to be calibrated to position at two distinct locations; top and bottom of stroke, at a fixed and known length apart. This limits the errors in the acceleration measurements. Additionally, but not strictly required, a barometric pressure sensor can be utilized to further calibrate the acceleration-to-position calculations during the vertical travel, compared to just at the top and bottom of stroke where the load transfer occurs. Atmospheric pressure data can help identify partial strokes and positively determine direction of travel and overall position of the sensing device and to supplement the accelerometer derived position.

During the work-over process, a manual count of equipment to be installed in the wellbore is maintained. When installing rods, this is less critical because the number of rods is limited by the length of tubing. When installing tubing, however, the exact placement of the pump is achieved by installing a prescribed number of tubing joints. This is handled through a manual tally count of tubing joints installed. Too many or too few tubing joints can cause the pump to be located incorrectly. Because this is a manual counting process, it is prone to errors. A byproduct of logging load and position during the work-over process is itself a log of the equipment installed. The total number of rods or tubing joints can be derived from the logged data and can assist the rig crew in their manual equipment count. This count information can be post processed, or displayed in real-time, given adequate on-board processing capabilities.

In addition to the count of equipment installed or removed, which can be obtained from the recorded log of load and position data, a profile of the handling of equipment can be derived. For example, when pulling rods, recorded loads can indicate if an abnormal condition was encountered that may have overloaded, and thus compromised the integrity of, the rods being pulled. Likewise running the rods too fast may be an indication of a careless or improperly managed rig crew. These measurements can help indicate potential sources of failure by identifying mishandled equipment.

In a rod pumped well, it is desirable to better understand the behavior of friction to both; improve the application of downhole equipment, and better understand the operational dynamics for analyzing existing pumping wells. The invention presented here aims to measure downhole friction and close the loop on applying that measured friction to improve design and analysis of rod pumped wells.

Continuous Rod, Tubing, or Cable/Wireline

The case of continuous rod and tubing resembles that of stick-rods and wireline/cable operation. A series of measurements of load and relative position at the same time and location, in one distinct point or element within the larger length of equipment, can be used to remove dynamic forces along the entire length of said equipment. The "position" measurement on traditional stick-rods is understood to be the "top" of the section of rods in the wellbore, and relative to the wellhead. This entire section is moving as it is lifted or lowered as a single, unchanging, mass. Or more specifically, "position" is also the point at which the loads (of said singular mass) are measured. These measurements of load and position do not need to be precisely co-located, but if they are separated, their offset needs to be considered. U.S. Ser. No. 16/946,232 provides a single sensing device to accomplish both measurements and is part of the lifting assembly itself. U.S. Ser. No. 16/946,232 also provides for a separation of sensing regarding the downhole tool and its position within the wellbore, as measured from surface. The present disclosure takes components of both devices in U.S. Ser. No. 16/946,232 to measure the length of equipment, which roughly corresponds to the depth of the equipment end within the wellbore and to measure load at surface on that changing length of equipment. Both measurements occur at surface, but may be sensed at different locations.

Continuous rods do not have a distinct "top" in the same context of sections of stick-rod. The entire continuous rod is a single mass, but only part of that mass is exposed to downhole friction, while the other part of the rod is on the spool or "above" the handling assembly. In other words, the mass we are interested in measuring is ever-changing as the continuous rod is extended or retracted downhole. The load reading needs to be defined as the point where the weight of the rods "in the wellbore" is borne. In stick-rods, this is obvious as the rod mass is entirely held by the lifting assembly (and additionally by downhole friction). In continuous rods, this point stationary relative to the wellhead, but moving relative to the length of rod as it pass through the wellhead.

Position in a continuous rod would be zero as the point of measure is not changing relative to the wellhead. The total length of rods in the wellbore is however changing, which affects the loads, and elasticity of the entire rod section in the wellbore. The apparatus disclosed in U.S. Ser. No. 16/946,232 considers the measurement of position as a distance relative to the wellhead at surface, as the lifting assembly is moving up and down with the entire section of rods. U.S. Ser. No. 16/946,232 handles the length of rods in the wellbore as an input to the wave equation which is updated in between each stroke of the rig where a section of rods is added or removed.

For continuous rods (tubing or cable/wireline), the lifting assembly is not moving vertically. It is static relative to the wellhead, while the rods are moved through the assembly. The mass and length of rods downhole is however changing. Therefore, the notion of "position" in the continuous rod context is more straightforward than in the case of stick-rods as it zero, or unchanging. On the other hand, the length of rods in the wellbore is changing during the handling process, which is distinctly different from the case of stick-rods where mass and length only change "between" handling. This length or rods in the wellbore may be directly measured from the length of rods that have passed through the continuous rod handling equipment, cable or spool, etc. The concepts of relative position and total rod length are compatible between continuous rods (and tubing or wireline/cable) and stick-rods, but careful attention to their difference needs to be understood.

Relative position in continuous rods (continuous tubing, wireline/cable) is zero as the point of measure is fixed, but the length of rods under the point of measure is changing throughout the measurement cycle. The measurement cycle is a series of load and position measurements where only one variable is changing. For continuous rods, this cycle would be the entire run (including starts and stops) of the rods up to a point of physical material change. In some cases, another section of rods may be welded into the continuous rod-string. The mathematical model inputs would be updated at this point to reflect change in rod properties.

Relative position in stick-rods is changing, but the length of rods under the point of measure is not changing during an individual stroke or measurement cycle. The length of rods changes between measurement cycles (between rig strokes), and the mathematical model is to be updated with the new rod properties. This update can be automated as a count of rods and their type/properties is known. The recorded data provides an additional count of rods that can be correlated to the know rod counts.

A rod length measurement on continuous rods (continuous tubing or wireline/cable) can be directly obtained by a distance or length sensor observing the rods as they travel through the wellhead or handling system. This can be a rotary encoder tracking the rod itself or placed on a rotational component of the gripper assembly, which in turn directly contacts and tracks the rod. On a cable/wireline operation this distance measure can be obtained similarly with a rotary encoder on a pulley or on the cable itself.

Typically, a continuous rod system will provide a distance measurement for the operator. This often is an analog wheel type "counter" gauge. A digital rotary encoder sensor can be used in conjunction with such an analog wheel gauge for the purposes of digitally measuring and recording positions over time, correlated to loads, for determining wellbore friction. Digitally recording these load and length/distance values is critical because the frequency of samples needs to be sufficiently high such that the calculations can execute with respect to the speed of the force wave traveling through the rods. This frequency is on the order of many samples per second with sub-inch accuracy. The distance measure on continuous rods is often sufficient to the nearest foot.

Other "payout" or distance sensors may be used such as ultrasonic, magnetic, visually calculated from a camera observing the surface of the rod, etc. The length/distance sensor is preferably located close to the point of load measure, but could be remotely located on the rod spool, for example.

The apparatus described in U.S. Ser. No. 16/946,232 is a preferably co-located measuring device for both load and relative position in a stick-rod handling procedure. For continuous rods (continuous tubing or wireline/cable), the physical sensors may be required to be located at different and separate points on the system. U.S. Ser. No. 16/946,232 discusses this in the context of the downhole tool where the distance sensor is located at surface, measuring the payout of the cable, and the load and acceleration are separately sensed on the traveling downhole tool. These measurements are then time synchronized. The measurements themselves are equivalent whether it is stick-rod, continuous rod or tubing, or wireline/cable. The load is the total load experienced at the point of measure, inclusive of mass, dynamic acceleration forces, friction, buoyancy, etc. The position or distance is the mass moved over time. This mass and length are unchanging in stick-rods, but the entire mass moves. In continuous rods, the mass and length are changing as the material moves into or out of the wellbore. In this case the relative position is zero, and the sensor is measuring a total length of equipment that has moved through the system.

Barometric Pressure Synchronization

The barometric pressure sensor presented in U.S. Ser. No. 16/946,232 is utilized for vertical height approximation and to compensate for calculated position errors from the accelerometer. To obtain position from an accelerometer, the acceleration readings must be integrated over time to velocity, and again to position. Errors in initial velocity or position can compound when performing this double integration from acceleration. Measurement errors in the acceleration readings may also compound over time. An example of this would be a stationary accelerometer that is subject to some random vibrations. This is a common case for a workover rig that may stop mid-stroke while other activities are performed. Those random vibrations may introduce accelerometer measurement errors which compound over time making it appear as if the "calculated" position, integrated from velocity and acceleration, is changing when in fact the device is stationary.

The load transfer to and from the hook in a stick-rod application, described in U.S. Ser. No. 16/946,232, provides a fixed vertical position for correcting this "acceleration to velocity to position" integration process. The barometric pressure sensor described in U.S. Ser. No. 16/946,232 can further provide updated position values throughout the stroke. Barometric pressure sensors, however, are subject to drift over time as the atmospheric pressure may change. The duration of a stroke is typically short relative to this atmospheric pressure drift. As described above, the time for a complete stroke on a rig may vary substantially and the sensor may remain stationary for an extended period, resulting in erroneous position calculation. Neither the accelerometer, nor a single barometric pressure sensor are suitable for long-term position determination. Compensating for atmospheric barometric pressure drift over time can greatly improve the accuracy of the position measurement, making it suitable for position measurements that exceed several seconds.

By providing a secondary barometric pressure sensor at a fixed location relative to the wellhead, the barometric pressure measurement from the vertically moving sensor can be corrected for drift. This stationary barometric pressure measurement is sampled initially as a "zero" value. Subsequent measurements can then be "zeroed" by subtracting the initial value from the current value of the stationary barometric pressure sensor measurements. This provides a "drift" measurement of the atmosphere. The "drift" value can then be applied to the measurements of the moving sensor to remove the atmospheric drift back to the time of the initial barometric pressure of the stationary sensor. The initial stationary pressure measurement is preferably determined at a known vertical location of the moving sensor, but it is only required that initial measurements occur at the same time and the stationary sensor remains at the same height/location for subsequent measurements. Subsequent measurements on both pressure sensors should preferable also be synchronized, but do not need to occur at high frequency, nor do they need to occur at precisely the same instance.

In the same fashion, a pumping well may be outfitted with a barometric pressure sensor located on the polished rod, and a secondary stationary barometric pressure sensor. The moving pressure sensor may be additionally provided with a load-cell, accelerometer, gyroscope, magnetometer, and transmitter. The stationary barometric pressure sensor may be included in the receiver in communication with the moving pressure sensor, or in conjunction with an existing data link. Such a data link may include an existing wireless load-cell signal from the polished rod, or a rod rotation sensor such as the one described in U.S. Ser. No. 16/228,233 (Apparatus and Method for Detecting the Rotation of a Rod-String in a Wellbore). Such a receiver is typically installed in a well automation controller, referred to as a pump-off controller that utilizes load and position data for the control and diagnostics of the well. As such, the position data can be processed by applying the difference between an initial stationary pressure reading and the current stationary pressure reading to the value of the moving pressure sensor reading. This corrected vertical position value can then be passed, along with a load-cell measurement to the pump-off controller for diagnosis and control. Other sensor measurements can be combined to further improve the vertical positional accuracy. This includes applying pressure derived positions and velocities to the acceleration to velocity to position calculations.

Realtime Display

The preferred sensing device described in U.S. Ser. No. 16/946,232 is entirely self-contained. U.S. Ser. No. 16/946,232 also discusses a split sensor where a downhole tool travels through the wellbore, while distances are sampled at surface. The addition of a secondary barometric pressure sensor requires a fixed location. This means the improved sensing device is distributed across at least 2 physically separate sensing components. The secondary barometric pressure sensor is logically located somewhere on the rig, or otherwise nearby, and in communication with the sensing device. This provides an opportunity to convey information to the operator through a dual-purpose display and stationary barometric pressure sensor. A display and pressure sensor do not need to be combined, and a display is not strictly required. There are however cases where knowledge of hook-load is otherwise unavailable to the operator, and so a display is a useful addition to the system.

Display of rig operating parameters is well known in drilling applications which have heavily instrumented rigs and dedicated operations centers where all rig parameters are collected and displayed. A workover service rig is rarely instrumented and so a need for a self-contained addon instrumentation system is needed. In some configurations of a workover rig, even the most basic measure of load may be unavailable.

Load and position (via acceleration and barometric pressure) are available on the sensing device described in U.S. Ser. No. 16/946,232 and are utilized for the sake of determining downhole friction. Those measurement parameters have immediate utility to the rig operator and can be transmitted wirelessly to either a dedicated display or a smartphone app. Several wireless technologies are suitable for this transfer such as Bluetooth or Wi-Fi, but other wireless technologies may be used. The data may also be transmitted over a wired connection but is typically impractical on the workover rig as it lacks such instrumentation. The necessary resources to install such an integrated system on a workover rig may be cost prohibitive. A self-contained "bolt-on" system of measurement and display makes the installation and use of such a system practical. Wireless communication between the sensor(s) and the display becomes a necessary link for ease of installation.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
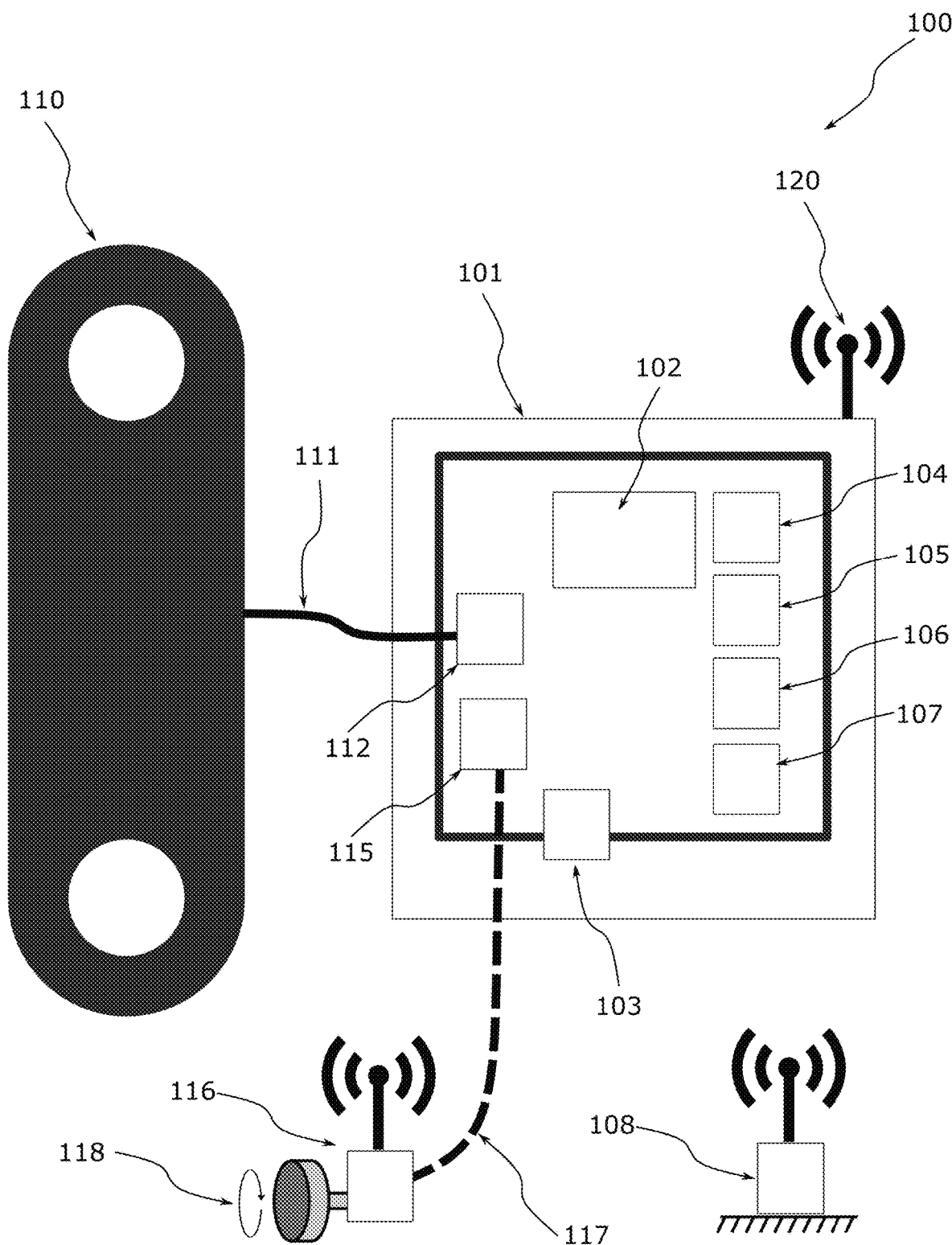
FIG. 1 illustrates a detailed view of the sensing device, and its various components, as placed inline with the rod hook. This is otherwise referred to as the surface sensing device.

The service, or work-over, rig refers to any piece of equipment tasked with installing or removing equipment in the wellbore. The service rig is typically a purpose-built mobile piece of equipment for the specific task of installing or removing rods and tubing in an oil or gas well. Other equipment may perform similar operations. These include, but are not limited to, drilling rigs, wireline trucks, or even general-purpose cranes. Although this document specifically discusses the act of well servicing (installing and removing equipment from an already drilled and completed well), substantial portions of this may also apply to determining friction while drilling a well, or during other phases of the well operation.

The rod-string refers to the length of rods present in the wellbore, used to actuate the downhole pump. These could be traditional rods or continuous rods. They could be steel, fiberglass, or other material. The rods can be operated in a reciprocating motion for a rod pump, or in a rotating motion for a progressing cavity pump. Traditional rods are typically installed or removed 1, 2, or 3 rods at a time by a work-over service rig. It should also be understood that, while this disclosure particularly discusses sucker rods, the same method can be applied to tubular equipment deployed within the wellbore. Rods and tubular equipment may be used interchangeably in this discussion, as they largely behave the same in terms of stretch and dynamics related to friction.

Continuous rod, continuous tubing, wireline or cable are interchangeable in much of this disclosure. They are all long slender pieces of equipment that may be disposed partially in the wellbore and partially at surface. The material or equipment is then gradually handled into or out of the wellbore. As said equipment is inserted into the wellbore, the length and mass downhole increase. Continuous rod and continuous tubing may be referred to as coiled rod or coiled tubing.

The wave equation is a general mathematical method for determining conditions at the far end of an elastic material (i.e. steel or fiberglass rods) under dynamic conditions. Much has been published on this topic, initially proposed in U.S. Pat. No. 3,343,409.

The Gibbs Conjecture refers to how mechanical friction is handled in the wave equation, or more precisely, how it is not handled. Specifically, it shows that unaccounted mechanical friction manifests in an incorrect calculation of load and position at the far end of the rod string. This results in a distorted dyno card.

A dyno card is the plot of load and position over the cycle of a pump stroke. This can be plotted at surface or at the pump. The "dynamometer card", or plot is a well-known representation to those skilled in the art. An example of such a plot can be seen in 941/942.

A load-cell refers to a device intended to measure tensile and/or compressive loads. A load-cell can take many forms such as a tension-link discussed herein, but also simple strain gauges and several other mechanical configurations. It is understood that the electronic signal from a load-cell is processed into a reading equivalent to a force, typically expressed as pounds.

Friction can occur in multiple forms. Viscous fluid friction is relatively well understood in the industry as it generally acts uniformly over the rods and is velocity dependent. This type of friction is includes in all current implementations of the wave equation used in the industry.

Mechanical friction is the focus of this work and acts at specific points, relative to applied normal force. It also varies from static to dynamic conditions. As the rod-string stretches, the timing and magnitude of the static-to-dynamic friction transitions becomes increasingly complex. It is therefore highly desirable to thoroughly understand, by way of direct measurements, the behavior of friction in a given wellbore.

Barometric pressure is the pressure exerted by a column of air and is measured by an appropriate sensor. Pressures downhole may also be encountered. The pressure definition for this disclosure is exclusively understood to be air pressure above the wellhead.

Continuous Rod, Tubing, or Cable/Wireline

In the case of continuous rod or tubing, the load measurement can occur at several location. In the case of a truck mounted system, the injector is lifted with the traditional workover rig. The same load-cell used in U.S. Ser. No. 16/946,232 can be placed in-line to obtain the load. As the rig is bearing the load of the injector assembly plus the rods, the load can be "zeroed" before the rods are inserted to into the injector. Alternatively, since the load is caried by the service rig, a weight indicator placed on the lifting cables or rig structure can provide the load measurement. These points are likely distant from the position measurement and so care would need to be taken to ensure fluctuating loads are due to the rods themselves and not the result of some intermediary equipment such as stretching cables. It is preferable, but not required, to co-locate (or closely locate) the load and position measurements. As with U.S. Ser. No. 16/946,232, those measurements should be synchronized in time as well.

For a dedicated continuous rod rig the load and position measurement may be integrated into the rig itself or into the grippers. As the grippers are typically hydraulically actuated, a load measure may be obtained from hydraulic pressure. Likewise, a position may be obtained from a measure of hydraulic fluid flow through the drive system. This would provide a unified load and position measurement but may not be sufficiently accurate or practical in all cases. A fully integrated rig, particularly found in advanced instrumented drilling rigs or coiled tubing rigs, may lack the measurement capabilities to obtain and log/process readings at the required frequency or accuracy.

It may be necessary to separate the load and position measurements. In one preferred embodiment, a load-cell is used to obtain the load on the entire injector assembly as suspended by the service rig. A rotary encoder is placed along the continuous rod as it passes through the injector assembly. The separation distance between these measurements is approximately 5-10 ft. The separation distance is not of concern to the calculations since the load is to be "zeroed", as is the position/distance, and this zeroing should converge the measured values to the same apparent physical location. The physical separation of the sensors may present a challenge for synchronization. Physically wiring the load and position sensor to the same processor is one option. The service rig is a challenging environment and so it may be preferable to minimize or eliminate cable runs. Synchronizing the measurements over a wireless link may be optimal.

Barometric Pressure Synchronization

The sensing device on the lifting assembly of a traditional stick-rod application is necessarily moving over large vertical distances (up to 75 ft), and so a physical wired connection between the fixed pressure sensor and moving sensing device is impractical. A physical connection, or time-synchronized logged and post-processed measurements are valid approaches and may be used in alternative embodiments. The preferred embodiment of this configuration utilizes a wireless link to immediately convey the stationary pressure measurements to the sensing device, or vice versa.

Typical modern smartphones include a barometric pressure sensor which may be suitable for this synchronization. In this case, a Bluetooth app and connection to the sensing device would be preferable. The Bluetooth app would connect to the sensing device traveling on the lifting assembly and correlate pressure readings from the stationary phone. Pressure relative to the initial synchronized reading can then be applied or retained for further post-processing.

In practice, the accuracy of the barometric pressure sensor on a smartphone may be insufficient. A phone may also change location. Large changes could be identified through GPS. There could be a 2 ft difference between holding a phone and placing it in a pocket. This would substantially affect the height measurements and so it is critical the stationary sensor remains stationary. Accuracy, update rate, and precision are all factors that may affect readings. An identical pressure sensor to the sensing device would be preferable as it would have a similar accuracy. This is not a requirement though.

A dedicated stationary display for feedback and operating parameters is an ideal location for a stationary barometric pressure sensor. This display can be mounted or placed on the rig in a way that would ensure it doesn't move vertically during the pressure value exchange.

Realtime Display

The stick-rod sensing device has load and position available as a self-contained, measurement. The continuous rod device is physically separated between load measurement and position measurement with either a wireless link or a physical cable. The preferred embodiment of the display utilizes a Bluetooth or other radio link between the display and the sensing device. Bluetooth provides a 2-way communication channel which is useful for synchronizing stationary and moving pressure sensor readings. Bluetooth is also low-power, and the communication distances are suitable as this is a local communication link between devices with a separation distance of approximately 75 ft at most.

Bluetooth also provides a means to connect via smartphone or other computing device. The local display is preferably a dedicated device, but an app could replicate its functionality. Bluetooth is only a representative example of the RF link for communicating between components of sensing, processing, and display. Other RF technologies may be substituted for Bluetooth in this context.

A significant challenge for any outdoor display is ruggedness and readability. There are several display technologies that may be suitable for a daylight readable display. This includes a traditional LCD display like a calculator, or newer technologies like e-ink. A pixel matrix screen provides an opportunity to present more information than simple numeric readings. Conversely, such a general-purpose display may be harder to read in the environment of a service rig and so a combination of display technologies may be required for optimal results. A plot of hook-load vs time (or position) is of great use to the rig operator as some operations require a very careful and precise handling of the rods. This relies on the skill of the operator but can be greatly improved by immediate feedback of loads in a visual plot.

The display may also include audio clues such as an overload threshold alarm. Likewise, a peak velocity alarm could be included if the rods are handled above a predetermined threshold for safe operation. A haptic feedback "buzz" may also be used as the rig environment can be exceedingly noisy and the operator should be focused on watching the rig, not a screen. Likewise, the operator should be listening for signs of danger and other crewmember communications. A haptic feedback line a cellphone vibrate can provide a distraction-free indicator to the rig operator.

A position indicator may be of use as the upper point requires the rig operator to stop the lifting assembly 75 ft almost directly above their head. This is visually difficult to assess from the ground. An audible or haptic clue set to trigger at a specific elevation (and compensated for changing atmospheric pressures) can improve the accuracy of the rig operator, and thus improve the overall efficiency of the operation. The selection of alert mechanism can provide a valuable information without distracting the rig operator.

Description of Selected Specific Embodiments

FIG. 1 illustrates the sensing device as implemented for a work-over service rig. The load-cell, 110 is illustrated as a tension link, which is to be placed in-line with the load being lifted. Any suitable load-cell, such as one with threaded pin ends, could be utilized. A processor 102 is collocated in the sensing device 100 to record readings obtained by the various sensors. Position measurements are obtained through a combination of sensors such as barometric pressure sensor 104, accelerometer 105, gyroscope 106, magnetometer 107, and an analog to digital conversion 112, to digitize the raw load-cell signal. Provided adequate processing power, the position of the sensing device 100 can be updated in real-time. Alternatively, the raw readings are logged to digital storage 103 to be retrieved and post-processed.

Because the sensing device is in motion and in a hazardous environment, it may be desirable to provide a wireless user interface to verify system integrity. A transceiver and antenna for data transfer may also be provided, 120. Real-time loading, position, equipment installed/removed counts, peak and average travel velocities, etc. can be provided to the user via an electronic receiving and display device such as a phone or computer. In some configurations it might be desirable to synchronize external measurements, such as a rotary encoder on the draw-works drum or cable. The transceiver may also be used for synchronization with these external sensors.

Additionally, an externally placed barometric pressure sensor, 108 is placed at a stationary position and in communication over the same radio link, 120.

A distance sensor 115 is provided to measure the length of continuous rod, tubing, or cable/wireline that passes through the sensor on its way into, or out of, the wellbore. Such a sensor may be a rotary encoder 116 with a wheel that runs along a piece of equipment to provide a measure of length. This sensor may be physically located at a different point, and so it is necessary to provide a communications link to the sensing device and processor. This may be in the form of a wireless link of the same variety as 120, or may be a separate channel. An optional wired connection 117 may also be provided if installation allows for such a configuration.

Remote sensors 108 or 116 may be powered by battery, external power, or, if wired directly to the main sensing device and processor, a power wire may be included with the data wires.

Figure 2:
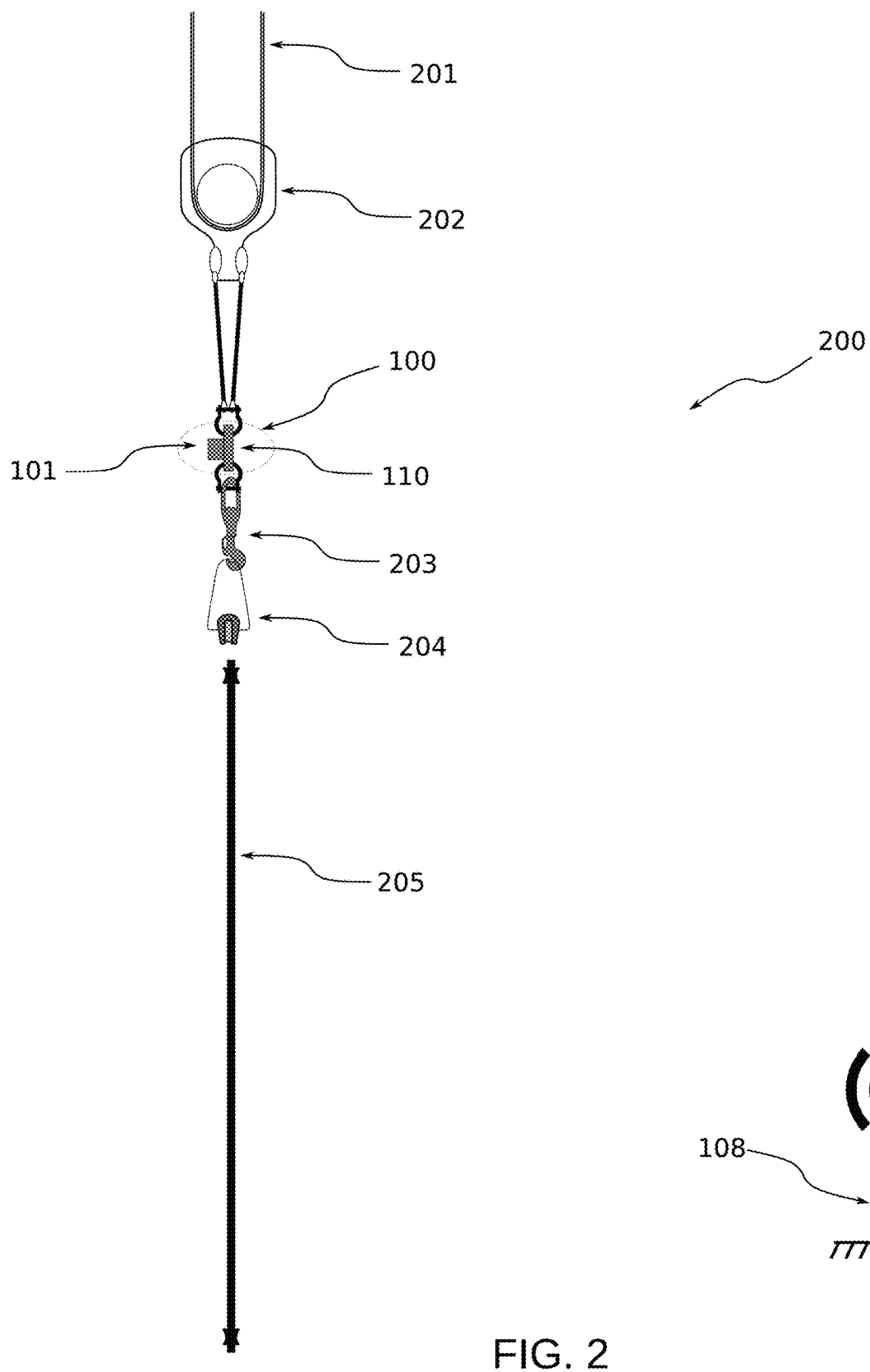
FIG. 2 shows the placement of the surface sensing device in a typical configuration on the lifting assembly of a typical work-over rig.

FIG. 2 illustrates the placement of the sensing device 100 in a typical configuration on the lifting assembly, 200, of a work-over rig. Cables, 201, are attached to a series of pulleys referred to as "blocks" 202. Through a series of mechanical connection, the blocks are connected to the rod-hook, 203. In a normal work-over configuration, the rod hook 203 is typically shackled directly to the lifting assembly. When handling the rods, the rod-hook 203 is used in conjunction with a pair of rod elevators 204 to bear the weight of the rods 205.

In this configuration, the sensing device 100 is placed above the rod-hook 203 with an additional shackle. This allows the sensing device 100 to directly measure the tensile loads via the load-cell 110. Alternatively, the load sensing component could be incorporated into the shackle or rod-hook itself. Placing the sensing device in-line with the lifted load ensures that loading is directly obtainable and not subject to undesirable external forces. Position measurements can also be measured at this point as it is precisely located at the equipment to be measured, both of which are advantageous in the processing of the data.

Figure 3:
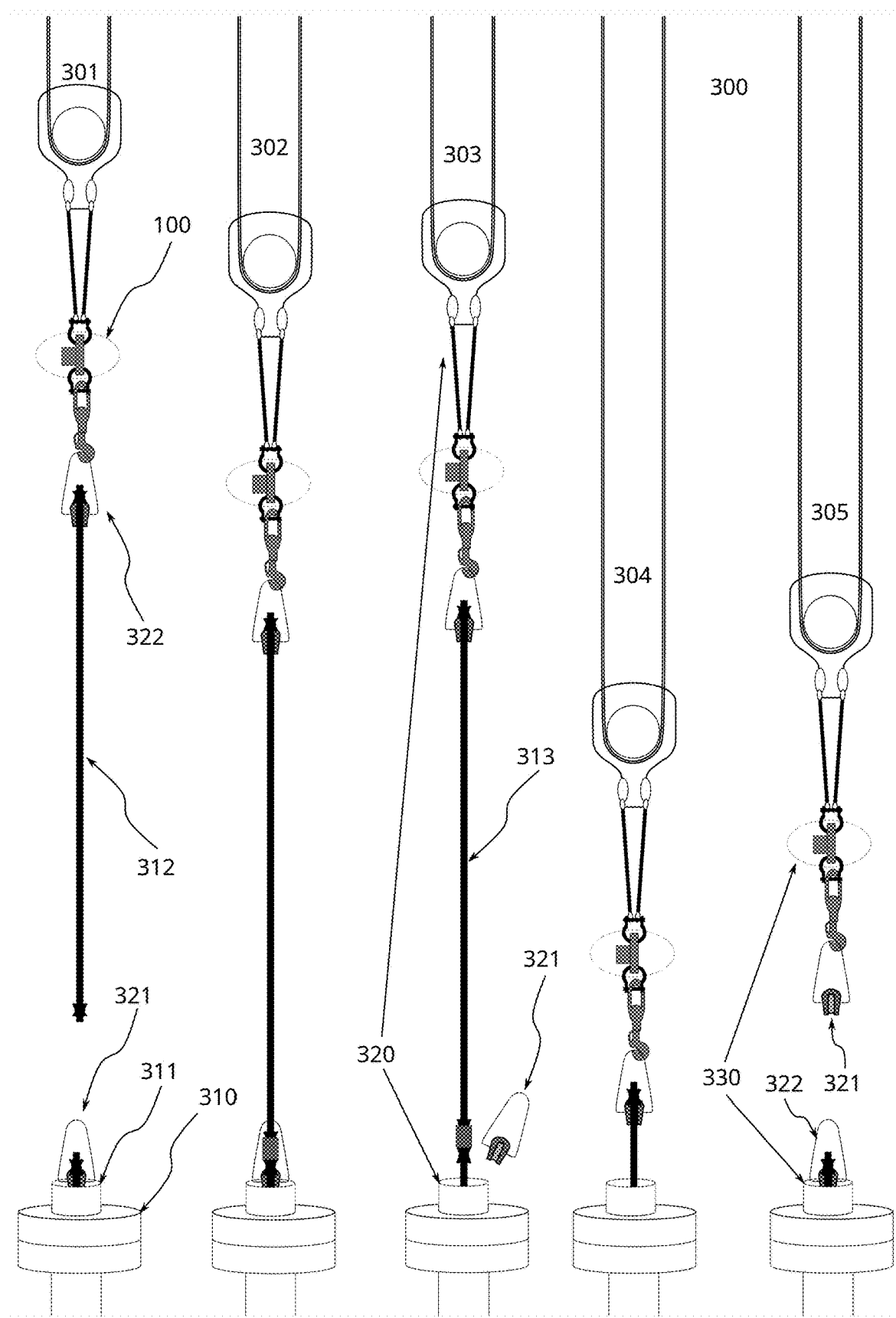
FIG. 3 provides a step-by-step process in which a section of rods are installed and the entire rod-string is lowered into the well. A similar, but reversed, process is used when removing rods from the well.

FIG. 3 illustrates a multi-step process of installing rods into the wellbore. As illustrated in FIG. 2, the sensing device 100 is placed inline as to observe the applied loads on, and position of, the rod hook. The wellhead is illustrated in 310 and the "rod table" is illustrated in 311. The initial process step illustrated, 301, shows a section of rods already hanging in the wellbore from the rod table, on the rod elevator 321. A "new" section of rods 312 is also initially illustrated as hanging from the rod hook on a second rod elevator 322. For brevity, the entire process is not illustrated, only the pertinent steps to identify loads and positions are shown in steps 301-305.

In the initial step 301, the sensing device sees the weight of a small section of rods (possibly multiple individual rods, typically no more than 75 feet). The new section of rods is lifted and positioned over the wellhead. The new rod section is then lowered and attached to the larger section of rods hanging from the wellhead 310-311. In step 302, the sensing device 100 briefly sees a reduction in loads as the rods are lowered and threaded onto the rods in the wellbore. In 303, the fully attached length of rods 313 is slightly lifted so the lower rod elevator 321 can be removed. It is important to note this load transfer occurs when the sensing device is high. 320 shows the load transfer happens at the wellhead but is seen by the sensing device a known distance above the wellhead.

Step 304 then lowers the rods into the wellbore, during which, the load and position are gathered throughout the length of the "stroke". This process of lowering the rods 313 (or alternatively lifting the rods) exposes them to downhole friction which is recorded by the sensing device. Of note, friction can only act along the length of rods currently in the wellbore. The process of repeatedly installing (or removing) rods changes the length of rods in the wellbore, which allows the sensing device to "see" friction acting at different depths by way of the friction-exposed rod sections. This is a key step in the friction measurement to be performed.

The process cycle concludes in 305 where the rods come to rest on the wellhead via the rod elevator 322 used to lift the section of rods. The lower rod elevator 321 that was removed in step 303 is placed on the rod hook so that the next section of rods may be lifted, and the process repeated.

Of note here is the load transfer illustrated by 330 again occurs by hanging the rods on the wellhead, but this time the sensing device is low. The load transfers at 320 and 330 allow the accelerometer to be calibrated when the sensing device is at a known distance apart (namely the length of rods just installed or removed). Increased load at the top and removed at the bottom indicates equipment was installed in the wellbore. Load increase at the bottom and removed at the top indicates equipment was removed from the wellbore.

Figure 4:
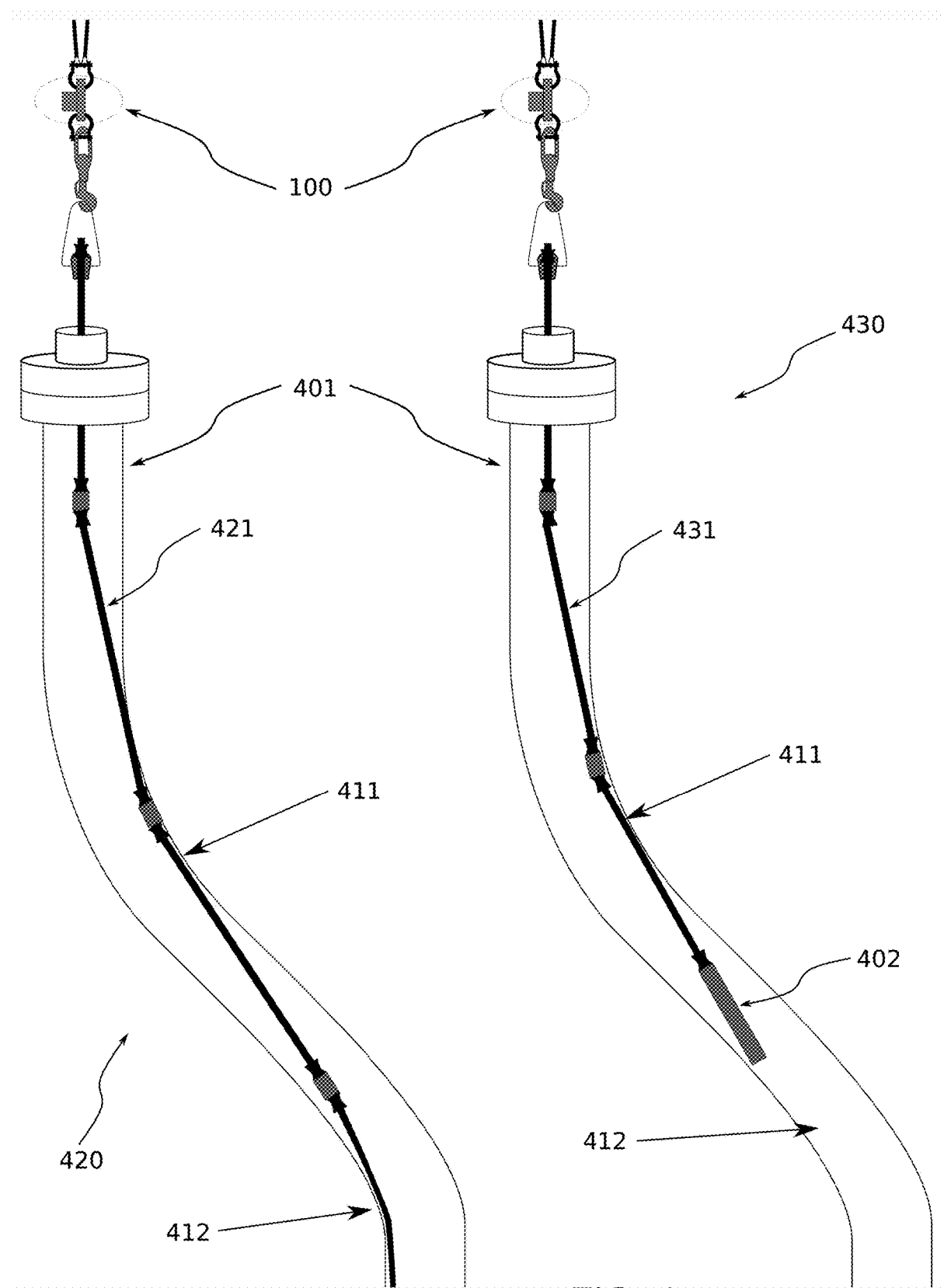
FIG. 4 shows downhole frictional contact points along the rods. This also illustrates how, by lifting the entire rod-string, the lower section of rods is no longer exposed to a friction point in the wellbore.

FIG. 4 illustrates a downhole view of the process in FIG. 3. In this illustration the rods are being removed from the wellbore, which is converse to the process illustrated in FIG. 3. 401 shows a single tube for simplicity. In an actual well, the rods are installed in tubing which is installed in casing. The purpose of this figure is to illustrate rod contact and thus friction in a deviated wellbore. Specifically, the contact points 411 and 412 impart a normal force on the rods under tension. 420 shows the rods, 421, extending passed the friction points 411 and 412 and loads observed by the sensing device 100 will include the cumulative friction-induced loads of both 411 and 412. Dynamic forces will also be observed, but these can be removed using wave equation methods.

Many rods have been removed in the right illustration 430 and the remaining rods 431 are no longer subject to the friction at point 412. The sensing device 100 now only sees the friction caused by 411. 402 illustrates the end of the rod-string which typically would be a pump or a plunger. Of note in this illustration is the comparative observations between the left 420 and right 430 illustrations provide a map of friction vs. depth for two distinct ranges. This is repeated for many depths to provide a continuous mapping through the wellbore.

Figure 5:
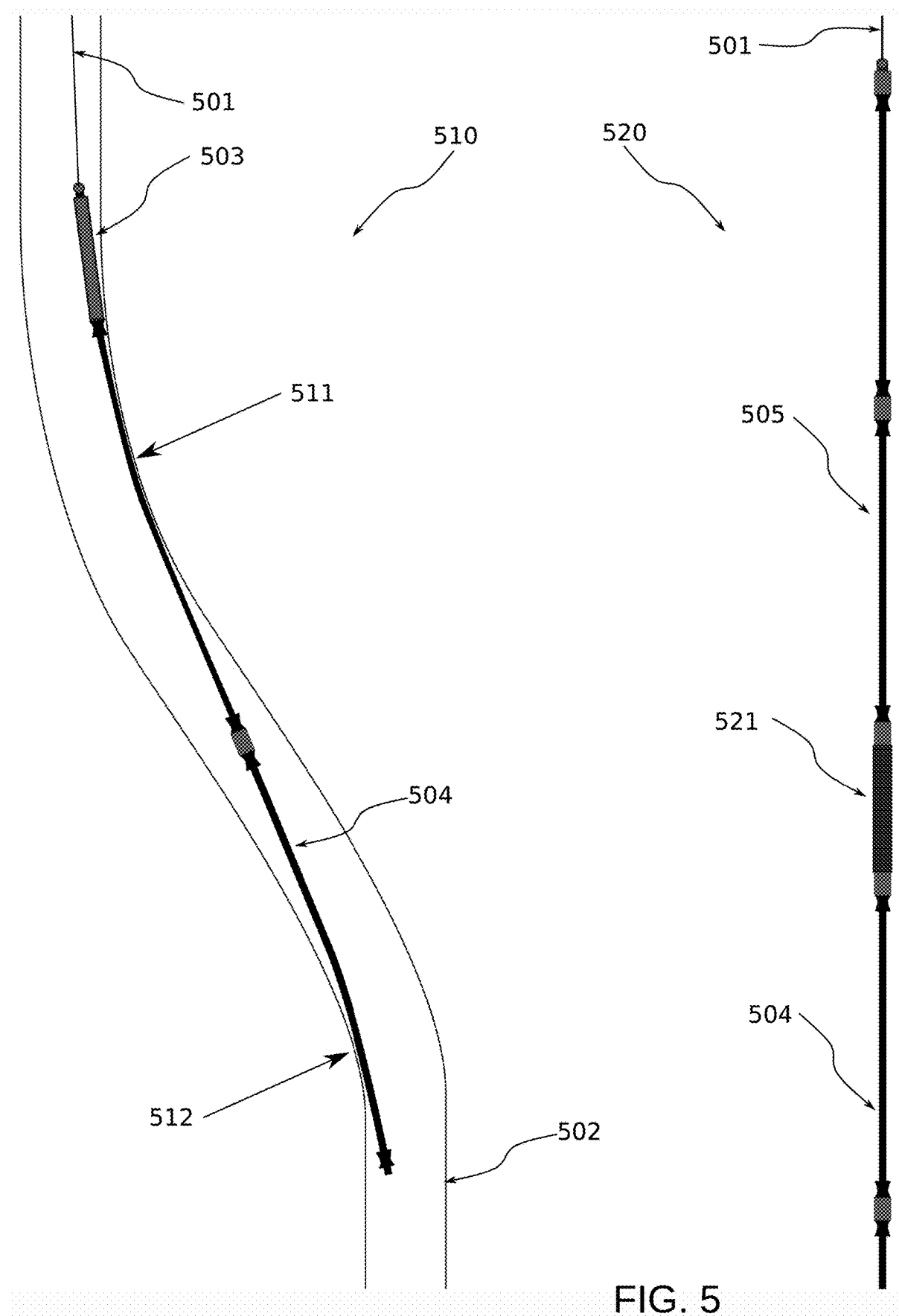
FIG. 5 shows a modified embodiment of the sensing device from FIG. 1. This embodiment is intended to travel with a section of rods through the wellbore and is otherwise referred to as the downhole sensing device.

FIG. 5 presents an alternative implementation of the sensing device, which is similar to that of FIG. 1. In this configuration, the components from 100, particularly the load-cell and electronics are packaged in a slim tool 503 or 521, which can pass through the wellbore 502, or specifically through the tubing within the wellbore. The housing of the sensing device is tailored to the environment in which it will operate, but the underlying method and measurement data for determining friction is similar. FIG. 5 also illustrates the downhole sensing device traveling through a deviated wellbore path. In this configuration, the tool is lowered via a cable or wireline, 501. On the work-over rig this cable is typically referred to as a "sand-line" but could be any mechanical attachment such as coiled rods or tubing, drill pipe, standard cable, etc.

A section of weighted rods 504 and/or 505 are attached to the downhole sensing device. Friction encountered along the weighted rod section, specifically illustrated at points 511 and 512, will impart a varying frictional resistive load on the tool. In 510, the tool will substantially register tensile frictional forces when being pulled up. Frictional forces encountered when traveling downhole may also result in a reduction in tensile load. The configuration in 520 adds a section of weight-bars to the top of the sensing device, which may help identify significant frictional restrictions as the sensing device can be "pushed" downhole, in addition to simply falling under its own weight. In this configuration, the tool could measure both tensile and compressive forces.

The length and weight of rod sections (504 and/or 505) will affect the friction measurements. The case of the surface tool configuration illustrated in FIGS. 1 through 4 is a general case, with a very long section of rods. Friction at varying depths using the surface sensing device is accomplished by keeping the surface tool in one general locating and varying the length of attached rods. In the case of the downhole sensing device (503 or 521), the friction at varying depths is determined by keeping the length of rods constant but varying the position of the assembly through the wellbore.

In the case of surface measurement, the elasticity of the rods is significant due to the length and so dynamics need to be accounted. Elimination of these dynamic conditions is handled through the wave equation methods discussed above. In the case of the downhole sensing device embodiment, the length of rods will generally be relatively short and can be considered rigid. On the other hand, because the cable 501 is long and elastic, motion dynamics of the entire assembly need to be accounted for. Fortunately, the nature of the data being collected, namely load and position measurements at regular and high frequency intervals provides an understanding of the motion of the tool through the wellbore. The dynamic loads can then be corrected for accelerations and orientation. Any remaining unaccounted forces are then attributable to friction acting on the rod sections 504 and/or 505.

Position measurement in the downhole configuration is challenging. The sensed load and position measurements need to be correlated in both time and space. One approach would be to use a wheel running on the inside of the tubing. This is quite challenging in a wellbore as the tool undergoes significant abuse as it travels through the wellbore and would likely render a mechanical position measurement ineffective. Another approach would be to record position at surface and synchronize the measured downhole loads in time. This would result in two distinct and separate components in which readings would need to be correlated after the tool is returned to surface. Additionally, the measured distance on the wireline does not always correlate to the position of the downhole tool as the wireline stretches and contracts with dynamic forces. The accelerometer 105 can help determine dynamic motion of the tool and could be further used to augment surface position measurements. In fact, the nature of the accelerations experienced in the downhole sensing device attached to a stretchy cable can indicate sticking and slipping, indicative of friction acting on the assembly. Pressure and temperature measurements could also be provided in the downhole configuration.

Alternatively, one or more magnetometers 107 could be used to count tubing couplings as the tool travels through the wellbore. One or more magnetometers 107 could also be utilized to determine a velocity of the tool as it passes metal couplings. This would manifest as a small distortion in the magnetic field seen by the magnetometer. With these fixed reference positions and corresponding velocities, the accelerometer could be recalibrated frequently to provide more accurate position measurements when traveling through the wellbore. This can be implemented with or without synchronized surface position measurements. Furthermore, the use of magnetometers provides a solid-state measurement and would be less likely to fail from mechanical abuse.

It should also be noted that both the surface sensing device and downhole sensing device could be utilized in the same well and their respective data-sets could be combined to further increase the accuracy of the downhole friction map.

Figure 6:
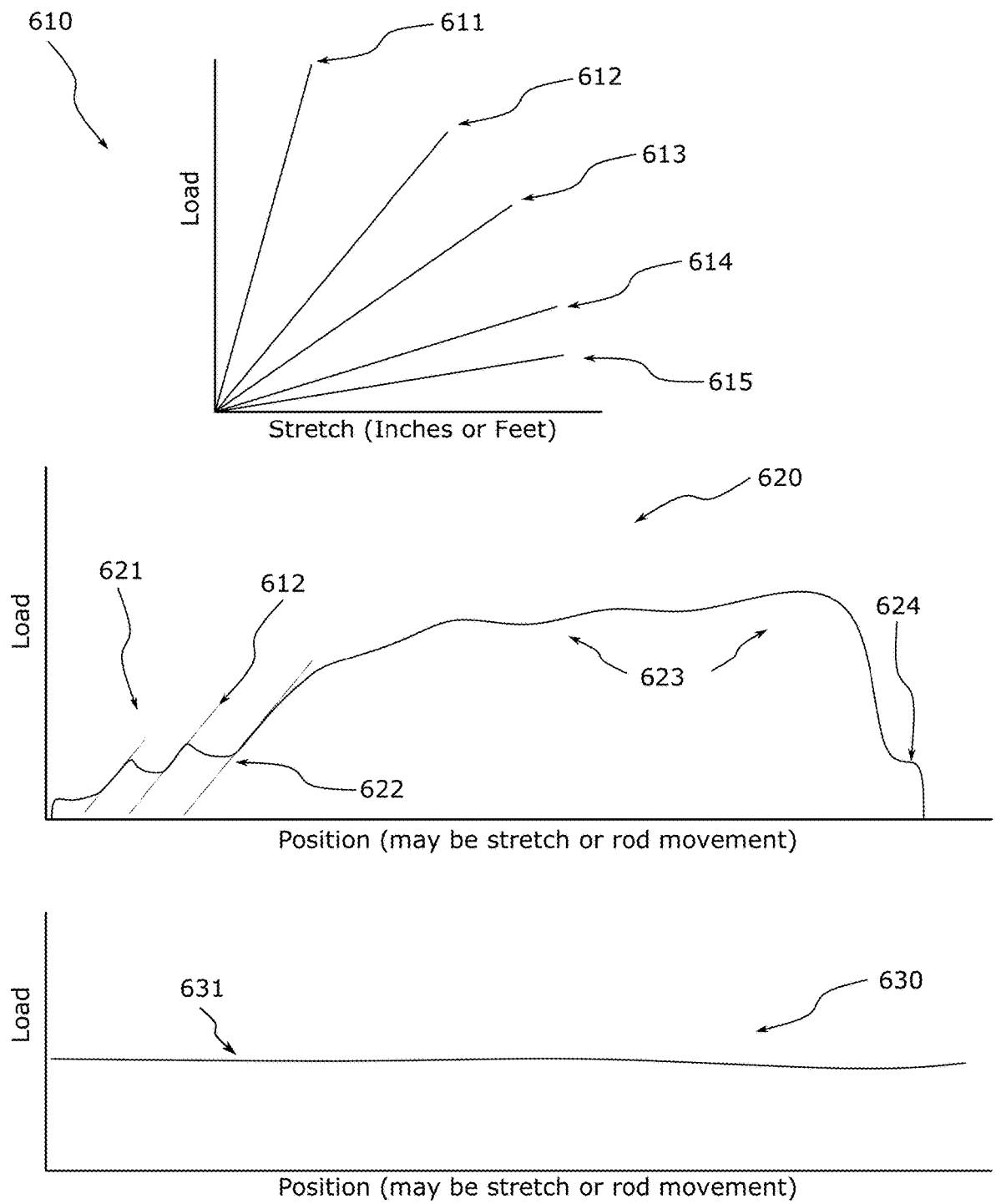
FIG. 6 shows various plots associated with a prescribed well procedure referred to as a "slow pull". This procedure is optional.

FIG. 6 illustrates an alternative measurement process that attempts to minimize dynamic forces. The main approach is to gather load and position data during normal dynamic work-over procedures, which requires the dynamic forces to be removed mathematically. The plots illustrated in FIG. 6 prescribes the rig to slowly pull on the rods in order to observe static friction. This is not a typical rig procedure but is simple and can yield useful additional measurement data.

610 shows rod stretch for different lengths of rods. This is a visual illustration of Hooke's law (F=−kx) where an applied load induces an elongation by a constant spring factor. More applied load results in more stretch and is illustrated as a straight line as it is a direct relation. The spring constant (k) is a factor of the overall un-stretched length and material. Slope lines are shown for different overall lengths of rod in 611-615. Shorter or more rigid rods are shown with a steeper slope. For example (assuming identical rod materials) 611 would indicate a shorter section of rods compared to 615 for the same applied load. Utilizing these slope lines, one can identify an applied load and positional change to identify a potential spring constant, and thus overall rod length between the point of measure and the point where the downhole rod section is held due to friction. Once enough force is applied to the downhole static frictional resistance, the frictional force transfers from static to dynamic. The result is a release of load as the rods being to move upwards.

620 illustrates a typical slow pull plot of load vs position. 621 shows a stick and slip behavior as the rods are held by a downhole frictional resistance. The rods slip when the applied load overcomes this frictional resistance. The slope of this pattern can be seen in 622 and can be referenced with the known slopes shown in 610 to determine a depth. In this case, the slope of the line matches that of 612, and so the length of rods corresponding to that spring constant can be identified. The remainder of 620 shows the rods in a dynamic friction state. For comparison, 630 is shown for the expected behavior of slow-pulled rods in the absence of friction. For an analogy, this would be like standing on a bathroom scale in a constant velocity elevator.

Lynn Roland observed this phenomenon in pumping wells, but for it to manifest, the static friction needs to be substantial or the pumping speed must be extremely slow. It is further complicated in a running well because a typical pumping unit is a crankarm driven system and is subject to accelerations during the stroke. The work-over rig affords an opportunity to control and minimize the dynamics to provide an accurate and consistent measure of static downhole friction magnitude and location.

Figure 7:
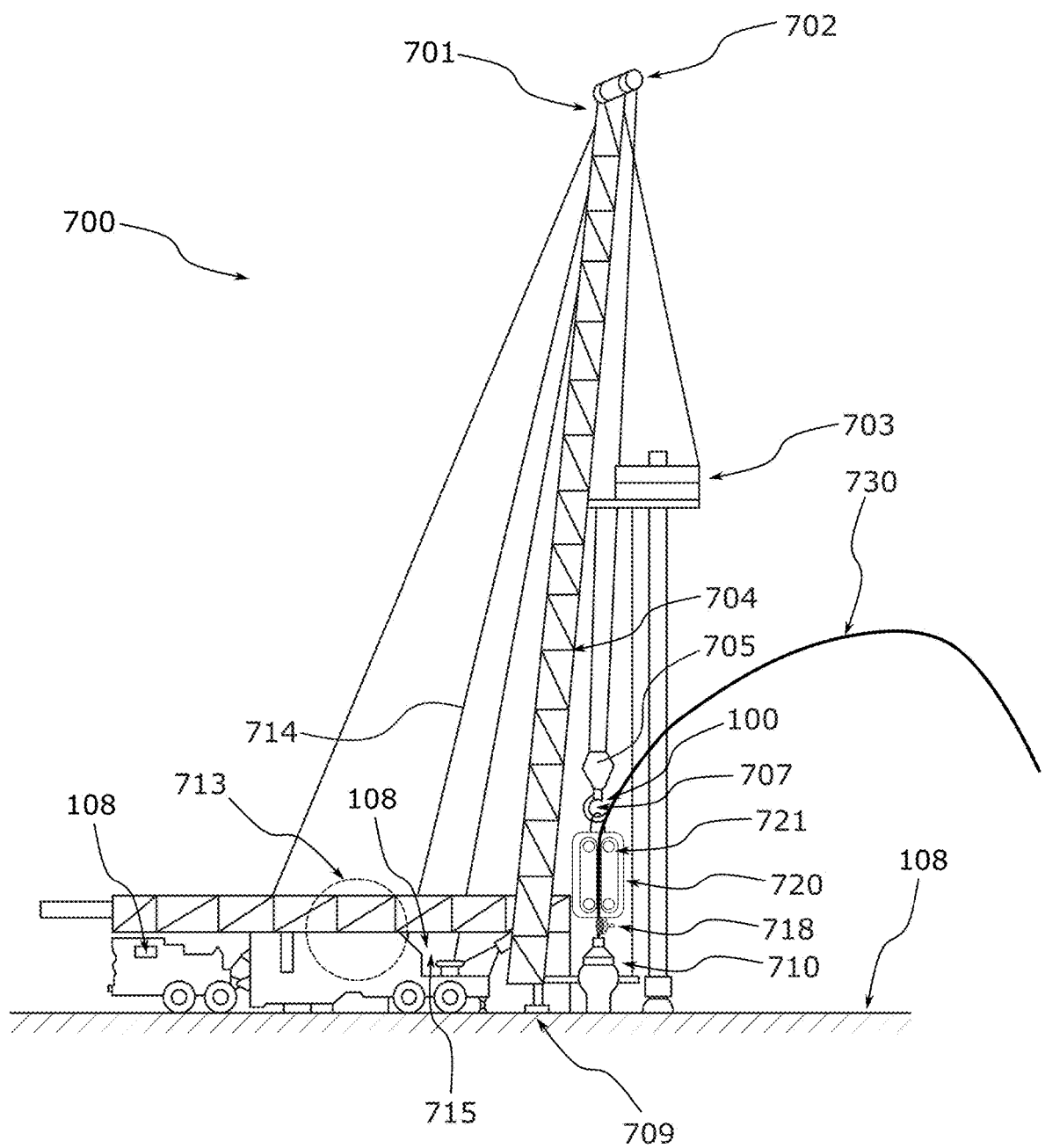
FIG. 7 shows various sensing locations on the work-over service rig. Load and position can be gathered from a multitude of locations. The preferred location, as illustrated in FIG. 2 is on the rod hook.

FIG. 7 outlines some of the alternative sensing locations. This illustration is provided to demonstrate the measurements can be implemented through multiple distinct and separate sensors. The self-contained sensing device illustrated in 100 or 503/521 is one of many possible measurement approaches. The preferred sensing location is as close to the top of the rods as possible. This is ideal from a loading perspective, but the process of determining position through acceleration data may be problematic. Fortunately, the load transfers discussed in FIG. 3 can help to calibrate the acceleration data to precise spatial points, which can help to limit accumulated errors. Alternatively, position can be obtained through the cable actuated lifting system, 714. This can take the form of measuring cable distance traveled, revolutions (or partial revolutions) of the various pulleys, 702 and 705, or cable spool 713 (draw-works). A measurement wheel can be placed along the cable to precisely measure distance traveled. Load can alternatively be obtained by a cable deflection along 714, structural loading on the rig 709, torque applied to the drum 713 (draw-works) actuating the cables, etc.

The stationary barometric pressure sensor can be located at any stationary, fixed position. 108 illustrates some possible positions, but this sensor could be placed anywhere in FIG. 7.

In the continuous rod context, FIG. 7 includes a continuous rod injector 720. The grippers 721 resemble tank treads and hold the continuous rod 730. As the grippers are actuated, the continuous rod is extended down into the wellbore, or pulled up from the wellbore. The injector assembly 720 and rod hook 707 remain stationary while the rod 730 moves through. U.S. Ser. No. 16/946,232 and FIG. 3 describe a traditional workover process where the rodhook 707 is traveling vertically as the rig lifts or lowers the rods. In the continuous rod configuration, the hook 707 simply holds the injector assembly 720 stationary over the wellhead 710.

Although the injector assembly is stationary, the load is carried by the rig via the hook 707. A load-cell 100 similar to that described in U.S. Ser. No. 16/946,232 can be placed at this interface. The load-cell would see the weight of the rods below the injector, plus the mass of the injector itself. As the mass of the injector is unchanging, that can be subtracted from the load reading. In general weighing procedures, this is known as a TARE operation.

The length measurement can be obtained from the rotational components of the injector 721, or from a separate wheel running along the rod itself 718. A rotary encoder such as 718 can be located anywhere along the rod 730. Similar to the load measurement being zeroed to eliminate the mass between the load-cell and the point just below the injector grippers, the position measurement should be zeroed to this same point in the rod-string. This can be accomplished by either zeroing the distance measurement at this point, or by subtracting the distance from that point to the distance sensor.

Figure 8:
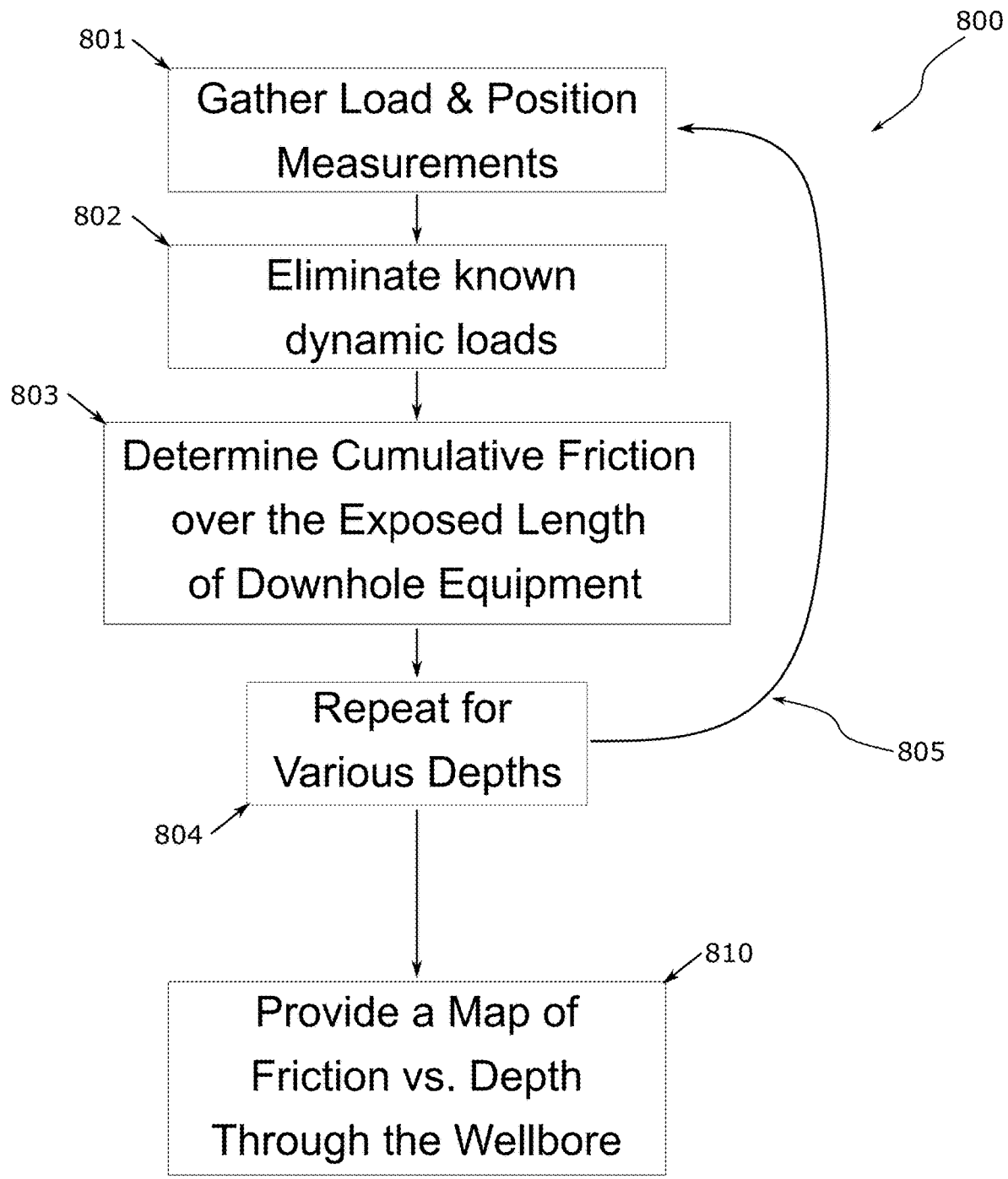
FIG. 8 provides a flow chart showing steps for performing the method of the present invention, in one embodiment.

FIG. 8 is a flow chart of the general method to determine and map downhole friction. Step 801 is similar to analyzing an operational well using existing wave equation methods. Because the well servicing operation is occurring without downhole pump action, 802 utilizes the wave equation to correct for the dynamic loading caused by accelerations and rod stretch. The remaining forces in 803 are an indication of the cumulative friction acting on the rods in the wellbore, as per the Gibbs Conjecture. Again, this states that unaccounted friction shows up in the resulting calculations. This is used to our advantage here. 804 repeats this for each section of rods (or other equipment) installed or removed. In the case of continuous rod, tubing, or cable/wireline, this occurs as part of the installation or removal. Once data is gathered and processed for each section of the wellbore, the process concludes and a map of the observed friction for each exposed depth is presented in 810. 810 represents the progression of friction measurements from each of the equipment installation or removal cycles, and thus depth, repeated by arrow 805.

Figure 9:
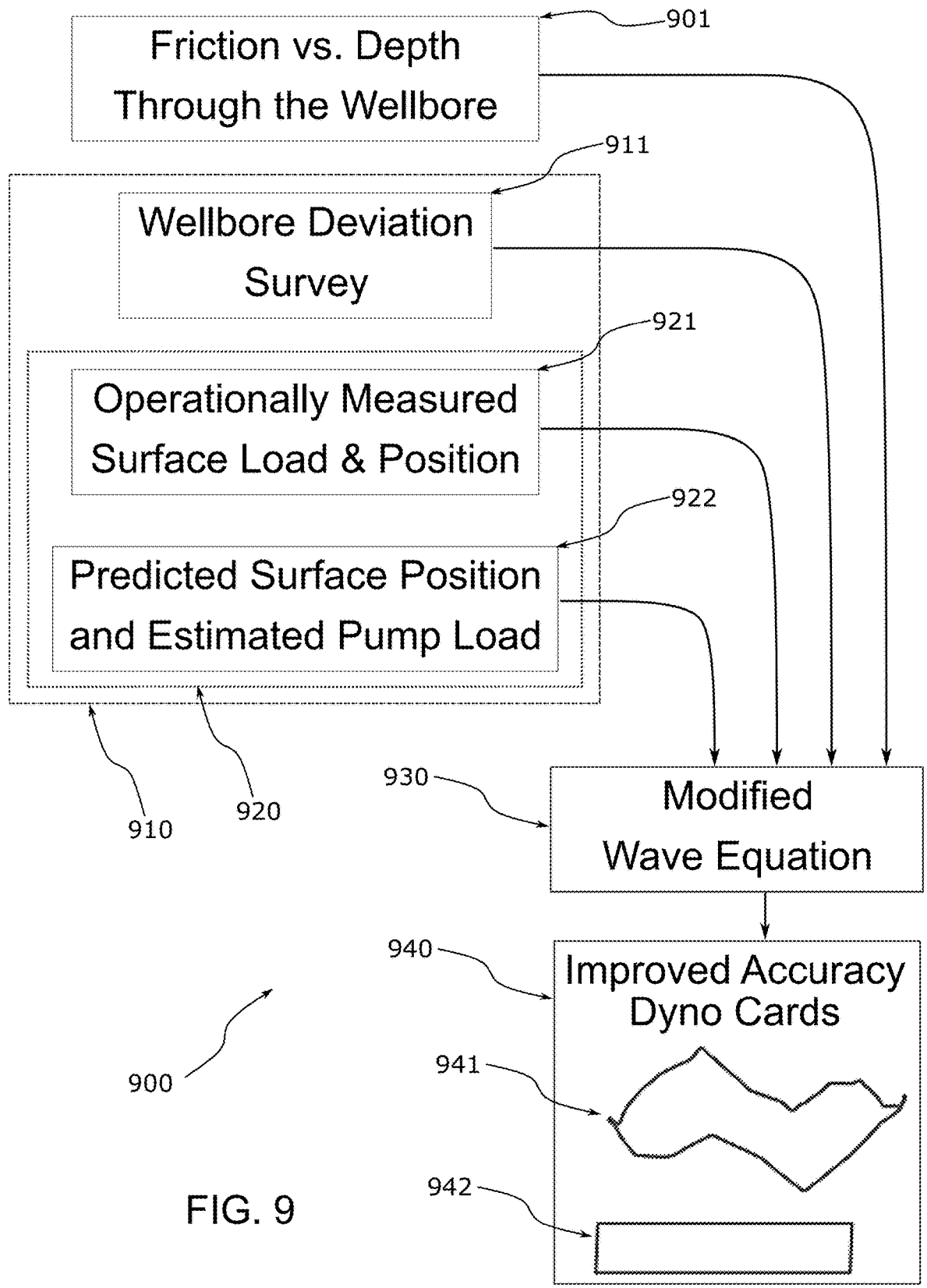
FIG. 9 provides a flow chart for applying the measured friction map to the design and analysis of a pumping well. This effectively closes the loop on the so-called Gibbs Conjecture in that a more precise friction model, by way of this method and apparatus, results in a more accurate calculation of conditions.

FIG. 9 is a flow chart of the general method of applying the downhole friction map to the design and diagnostic methods of pumping wells. The friction map is ideally gathered through the method illustrated by FIG. 8, and by using the sensing device discussed herein, but friction could presumably be obtained through other, yet undetermined means. One such approach is disclosed in application Ser. No. 15/929,928 "Dynamic Pumpjack Load Verification".

The current industry approach is contained in 910 where a wellbore survey is combined with either measured data 921, or predicted data 922, into the wave equation to produce calculated dyno cards 941/942. 920 shows the two fundamental approaches to start the calculation. In 921, an operational well generates load and position data at surface and the wave equation calculates the load and position at a distance, namely the pump. This is referred to as the diagnostic or analytic approach. Briefly, given the surface measured plot in 941, the downhole plot in 942 is calculated. 922 shows the predictive approach and is used when designing a pumping system. In this, the surface motion is predicted from equipment geometries and the pump loading is predicted from pump size, depth, and fluid properties. The wave equation then calculates the remaining conditions of surface load and pump position ahead in time. In other words, one component of plot 941 and one component of plot 942 is given, and the other components are calculated to complete the plots.

The addition of a measured friction map through the wellbore, 901, can be incorporated into a modified wave equation implementation, 930. The result is improved accuracy dyno cards 940. Of importance, utilizing the Gibbs Conjecture and the same friction model, the resulting dyno cards generated by both the diagnostic source data 921, and the predictive source data 922, should produce identical dyno card plots. This serves as a check on the accuracy of the friction model 901 for the given well incorporated into modified wave equation 930. A further improvement to this method would be to utilize measured surface position for the predictive approach. FIG. 9 primarily discusses operational wells but can also be incorporated into the method of determining friction using the work-over service rig. The diagnostic approach is primarily used to determine a calculated load variation perceived at the bottom of the rods. This is assumed to be cumulative friction acting over the entire rod length. Conversely, the "predicted" surface loads could be compared against actual surface loads to get another perspective on downhole friction acting on the rods (or tubing) moving through the wellbore.

Continuous Rod, Tubing, or Cable/Wireline

Figure 10:
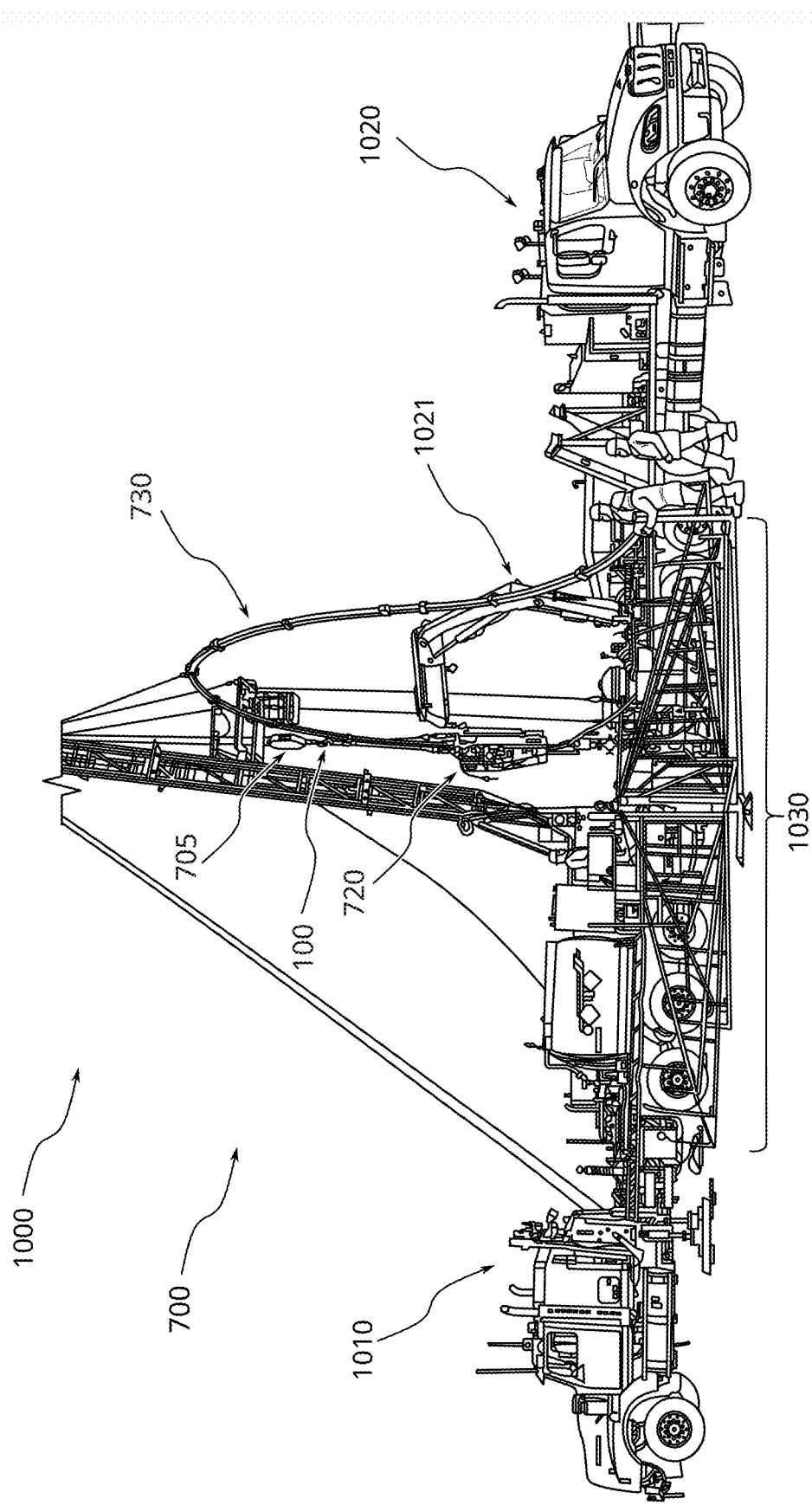
FIG. 10 illustrates a typical continuous rod workover configuration. This includes a traditional workover rig on the left, a truck mounted injector on the right, and a continuous rod spool in the foreground.

FIG. 10 illustrates a typical continuous rod workover configuration 1000. This includes a traditional workover rig on the left 1010, a truck mounted continuous rod injector on the right 1020, and a continuous rod spool in the foreground 1030. A dedicated continuous rod rig would combine the function of both trucks into one rig but is functionally similar to that depicted in this illustration.

The rig on the left is similar to that depicted in FIG. 7. The rigs' lifting system bears the load at the blocks 705. The connection between the rig lifting assembly and the handling equipment is accomplished via a hook and shackle. This is an ideal location to measure the carried load using a loadcell similar to that depicted in FIG. 1, 100.

The handling equipment, or continuous rod injector assembly 720 is maneuvered over the wellhead by a crane 1021, mounted on the continuous rod service truck 1020. This crane is not capable of bearing the weight of the rods in the wellbore and is there for the sake of conveniently moving heavy equipment like the injector assembly. The service rig 700 then lifts and holds the injector assembly during the operational phase of installing or removing equipment.

As the rods are handled by the injector 720, they are directed up and over a guide assembly 730 and onto the spool 1030. This guide assembly is provided to ensure the rods are contained during the process. An opportunity to measure length of the processed rod can occur anywhere along the rod from the wellhead, through the injector 720, along the track 730, or on the spool 1030. The preferred location for measuring length of processed rod is somewhere along the injector assembly 720, or immediately above or below that.

Barometric Pressure Synchronization

Figure 11:
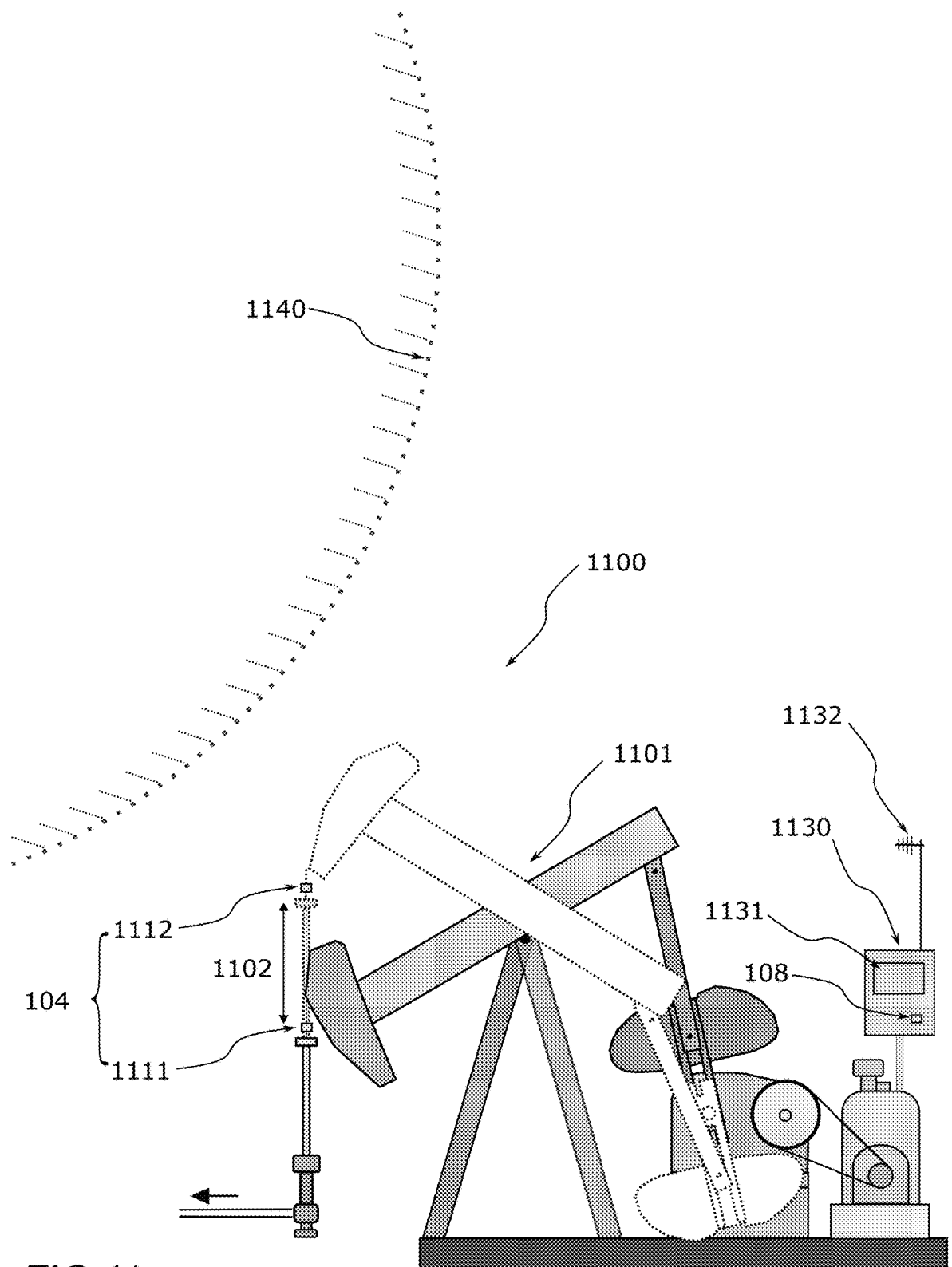
FIG. 11 provides an illustration of a stationary barometer and a moving barometer in a typical operational pumping scenario.

FIG. 11 shows a typical pumpjack at 2 points in the pumping stroke; top of stroke and bottom of stroke. The pumping system pivots at 1101 over the saddle bearing. This converts rotational motion to vertical motion at the polished rod. The vertically moving barometric pressure sensor 104 is attached to pumping unit and travels along the vertical path indicated by arrow 1102. The maximum possible elevation of the moving sensor is at 1112 and the minimum elevation is at 1111. During a stroke, the polished rod oscillates between these vertical points.

A typical well controller is illustrated by 1130. The stationary barometric pressure sensor 108 is preferably integrated into this same controller, but may simply be placed in this cabinet and integrated into another piece of equipment internally. Several wireless load-cells exist and so it would be advantageous to integrate the barometric sensors into such a system. Such a wireless load-cell could contain the moving barometric pressure sensor 104, configured to transmit its measurements along with the load-cell measurements. The receiver of the wireless load-cell system could contain the stationary barometric pressure sensor 108.

A display 1131 is provided, which could be part of the existing controller or a dedicated display or application running on a smartphone. An antenna 1132 is provided to place the moving sensor 104 in direct communication with the stationary sensor 108. Such a display may differ in a pumping well application vs. a service rig application.

A typical pumpoff controller may have a radio communication system installed to convey readings back to a central location. The antenna 1132 and wireless link in this figure are intended to indicate a short-range local communication in the immediate vicinity. This is separate from existing wireless network wireless communications.

An atmospheric pressure change is illustrated by 1140. Pressure is not visible as such, and so this is meant to indicate the general concept of a pressure front moving through the location 1100. As the pressure front moves into the vicinity of the pumping unit, both barometric pressure sensors (104 and 108) should be affected roughly equally. Wind gusts may affect the 2 pressure sensors unequally, but such gusts are transient. On average, and over long periods, the pressure sensors should see consistent and equal pressure changes that are a result of macroscopic atmospheric pressure changes. The distance between pressure sensors 104 and 108 should be less than a few hundred feet, which is close in terms of atmospheric pressure. In other words, the 2 sensors should be experiencing the same general conditions as a pressure front 1140 moves through the vicinity.

Figure 12:
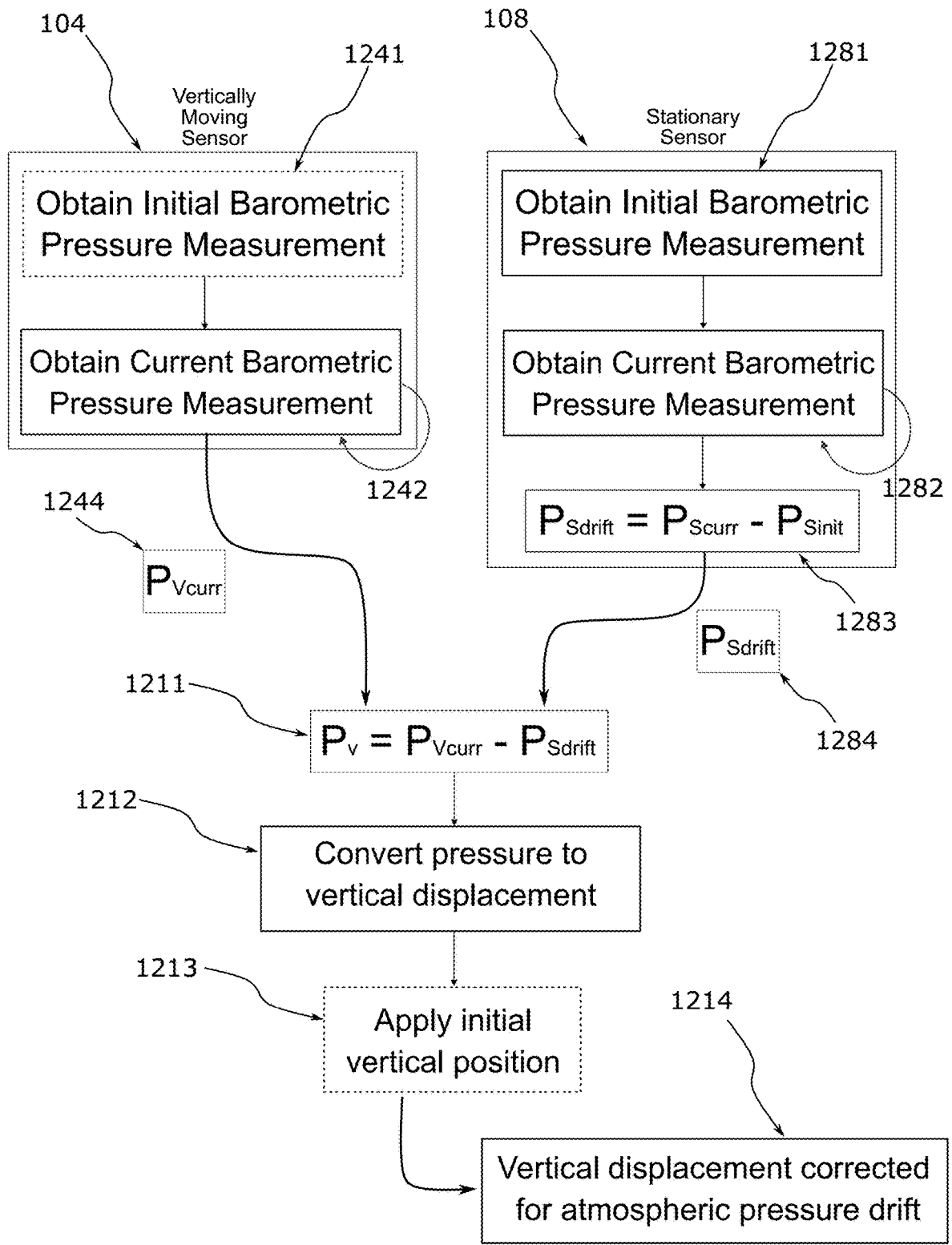
FIG. 12 provides a flowchart of the barometric pressure synchronization and correction.

FIG. 12 shows a general flow chart for applying pressure drift compensation. The vertically moving barometric pressure sensor 104 and stationary barometric pressure sensor 108 are illustrated in previous figures. The columns are meant to indicate where the pressure measurement is obtained. Of importance is the initial barometric pressure reading 1280 on the stationary sensor. This value is to be retained as $P_{Sinit}$ for the initial stationary pressure. Optionally, an initial pressure measurement may be obtained 1241 on the moving sensor. This is not strictly required, but if it is obtained, a corresponding vertical height should also be retained.

Following the initial measurement, the sensors should continue to obtain current measurements ($P_{scurr}$ for stationary current pressure and as $P_{Vcurr}$ for vertical current pressure). Ideally these measurements should be closely synchronized in time, but in practice the rate of macroscopic atmospheric pressure drift is slow. Therefore, the sample rates 1242 and 1282 may differ. The "most current" measurement from both sensors should be used before proceeding to the next step. 1283 illustrates the calculation of the atmospheric drift at the stationary sensor. $P_{Sdrift}$ represents how much the pressure has change, but because the sensor is stationary, it is known that the pressure change is not a result of an elevation change. The vertical pressure 1244, $P_{Vcurr}$ and the stationary drift 1284 $P_{Sdiff}$ are then used in step 1211 where a corrected pressure value Pv is determined. This is the pressure corresponding to the vertical displacement. Step 1212 converts this to a meaningful vertical distance by changing pressure units to distance units in terms of air column pressure. This corresponds to an absolute height, typically in reference to sea level, but it is more precisely relative to the stationary pressure sensor. If an initial vertical displacement/position was obtained from the moving sensor, this value can optionally be applied in step 1313. The resulting value is a vertical displacement corrected for atmospheric pressure drift 1214.

Realtime Display

Figure 13:
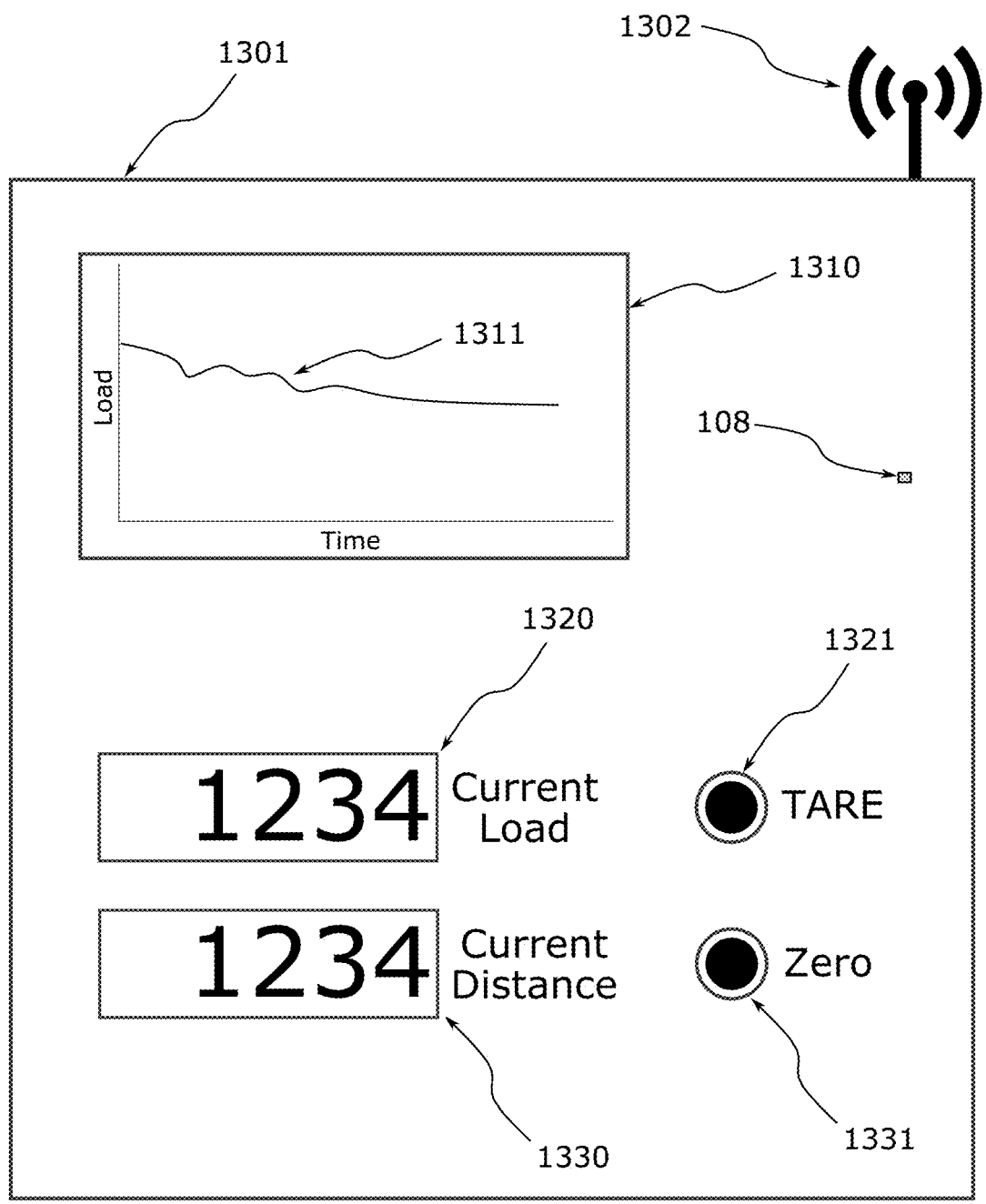
FIG. 13 provides a typical wireless link between the sensing device and a user display or smartphone connection.

FIG. 13 provides an illustration of a wireless link and display. 1301 may be a dedicated device, or may be an application running on a smartphone. Additionally, both a dedicated display and a smartphone app can coexist over an appropriate multi-channel link. Components of the display illustrated in 1301 may be implemented on one or both of a dedicated display and/or smartphone app. The link 1302 is in communication with the sensing device and processor via 120 and represents a direct connection, or a network of multiple devices in the immediate vicinity of the well.

A historical plot of loads 1310 may be displayed through an LCD screen. This screen may also be used to display other pertinent information. The load plot 1311 is provided for the operator to observe historical loads. In this case the plot shows the loads stabilize on the right. This may indicate the rods have stacked out downhole. There is still some load on the hook, but the lower section of rods is resting on the bottom. This load difference may be very small and difficult to observe from a typical dial-type weight indicator. A rig operator traditionally must identify this point by feel alone. This small load difference is easily visualized with time-sampled historical data, which can improve accuracy and remove human error.

The screen 1310 may be an LCD matrix display such as that of a graphing calculator, or any form of digital display. As this is preferably sunlight-readable, an e-ink display may be used. Alternatively, the display may be split such that advanced plots like 1311 may only be shown on a smartphone app. This screen may serve multiple purposes to display several data measurements and parameters.

Current load value in pounds, or other weight units, may be displayed on a large dedicated readout 1320. This is preferably displayed through a sunlight-readable digit display but could be located on a generic matrix screen like the one used to draw the load plot (1310). The load borne by the load-cell 110 may include additional components that are not part of the specific rods to be measured. The shackle, rod-hook, and rod elevator may add a hundred pounds or more to the measurement. Likewise, a continuous rod injector may add many thousands of pounds to the load measurement. This load should be eliminated from the measurement as it is not part of the actual variable load of the downhole exposed material. A common practice in scale measurements is a TARE operation. In short, this "zeros" the load reading. A button 1321 is provided to allow the user to zero the load reading.

The current distance display 1330 may have different meaning depending on the installation context. In a stick-rod or generic lifting application it may be the vertical elevation of the sensing device relative to the wellhead. For a generic crane, this would be useful to see how high the hook is. In a continuous rod, tubing or cable/wireline, this distance would correspond to the material that has passed through the sensor, or the total length of the equipment downhole. This may be referred to as "payout" of the cable. Like the TARE operation for load, it is useful to reset the length value and a button 1331 is provided to do so. This button may also be used to re-synchronize the barometric pressure sensor and/or identify a specific position of the vertically moving sensing device.

A typical wireline truck would have a display of load and cable "payout" as these trucks are instrumented for that purpose. A sand-line cable on a traditional workover rig is not instrumented, and so a unified display is not available. This display may be portable to use in such an application or permanently installed on a rig or operational well.

Optionally, the static barometric pressure sensor 108 may be integrated into this display. Smartphones typically include a barometric pressure sensor, so the display illustrated by 1301 may be entirely implemented through an application running on such a phone.

I claim:

1. An apparatus for measuring downhole friction in a wellbore during a workover or wireline procedure, comprising:
   a continuously varying length of continuous rod, continuous tubing, wireline, or cable disposed into a wellbore and exposed to downhole mechanical friction to be measured;
   a sensing device comprising at least one load sensor and at least one distance, or length, sensor configured to obtain a plurality of measurements, at synchronized points in time, correlating sensed load and exposed downhole length of said continuous rod, continuous tubing, wireline, or cable, wherein said sensing device is configured to gather said time synchronized measurements as said continuous rod, continuous tubing, wireline, or cable is continually inserted into, or continually removed from, the wellbore;
   a processor configured to:
      determine velocity and acceleration of dynamic motion of the continuous rod, continuous tubing, wireline, or cable based on the plurality of measurements made by the sensing device by correlating a change in exposed downhole length of said continuous rod, continuous tubing, wireline, or cable over time;
      determine loads attributed to friction by eliminating loads attributed to the determined acceleration of a portion of said continuous rod, continuous tubing, wireline, or cable at an upper position of the exposed downhole length, and;
      by continuously updating the properties of the exposed downhole length of said continuous rod, continuous tubing, wireline, or cable to account for increasing or decreasing mass and increasing or decreasing elasticity, and
      determine cumulative friction-induced tensile forces acting over the exposed length of continuous rod, continuous tubing, wireline, or cable, moving within the wellbore; and
      create a friction map of the wellbore based on the determined cumulative friction-induced tensile forces relative to the downhole length of exposed continuous rod, continuous tubing, wireline, or cable.

2. The apparatus of claim 1, wherein the sensing device is located on a service rig lifting assembly, and further comprising:
   a continuous rod or continuous tubing injector, or a wireline/cable drive system configured to carry a load of a variable length of continuous rod, continuous tubing, wireline, or cable disposed into the wellbore to; provide a measure of time synchronized load with the exposed length of continuous rod, continuous tubing, wireline, or cable; and
   material properties of continuous rod, continuous tubing, wireline, or cable are known, but downhole friction conditions are not initially known.

3. The apparatus of claim 2, wherein the sensing device comprises a load-cell and at least one of: an accelerometer, a gyroscope, a barometer, a magnetometer, a rotary encoder, a wheel type counter, a string potentiometer, a laser distance sensor, a sonic distance sensor, or combinations thereof, and said one or more sensors are placed at different locations along the lifting assembly, continuous rod or continuous tubing injector, or a wireline/cable drive system, and are configured to provide a combined measure of load and exposed downhole length corresponding to an upper finite element of the exposed downhole length of continuous rod, continuous tubing, wireline, or cable, wherein load and position is further calculated for each finite element of the continuous rod, continuous tubing, wireline, or cable disposed downhole.

4. The apparatus of claim 3, wherein the sensing device further comprises one or more length sensors to determine the dynamic force present in a distinct upper element of the exposed downhole length of the continuous rod, continuous tubing. wireline, or cable, and the length of continuous rod, continuous tubing, wireline, or cable disposed downhole, wherein:
   the load-cell and one or more length sensors communicate their measurements to the processor, and
   the processor adjusts measured values from said one or more sensors placed at different locations along the lifting assembly to represent combined measurement of both load and position at the distinct upper element of the exposed downhole length of continuous rod, continuous tubing, wireline, or cable such that load corresponds to a cumulative load below said distinct upper element, and
   the measured length corresponds to a total length of continuous rod, continuous tubing, wireline, or cable below the upper element, and;
   said measurements are time-synchronized.

5. The apparatus of claim 4, wherein the apparatus is configured to move the continuous rod, continuous tubing, wireline, or cable at a variable rate of movement into or out of the wellbore, and
   the apparatus further comprises a plurality of load-cells located at different locations along the continuous rod, continuous tubing, wireline, or cable in the wellbore;
   the one or more length sensors comprise a plurality of length sensors located at different locations along the continuous rod, continuous tubing, wireline, or cable in the wellbore,
   wherein the processor removes dynamic motion and dynamic loads from the measured values to reveal friction acting on the continuous rod, continuous tubing, wireline, or cable at various depths along the wellbore by comparing measurements of the load-cells and the plurality of length sensors placed at said different locations along the continuous rod, continuous tubing, wireline, or cable in the wellbore as the length changes due to the continued insertion or removal of continuous rod, continuous tubing, wireline, or cable in the wellbore.

6. The apparatus of claim 4, wherein the apparatus is configured to move the continuous rod, continuous tubing, wireline, or cable at a constant rate of movement, and
wherein the processor compares the measured load with an expected load computed from known material properties, total length of the continuous rod, continuous tubing, wireline, or cable disposed downhole, and fluid properties surrounding the continuous rod, continuous tubing, wireline, or cable in the wellbore, and
a difference in measured and expected load, when traveling at a constant rate, corresponds to a cumulative friction acting on the said length of continuous rod, continuous tubing, wireline, or cable; and
the processor reveals friction acting at various depths along the wellbore by comparing measurements of the one or more sensors placed at different locations along the length of continuous rod, continuous tubing, wireline, or cable as said length changes due to the continued insertion or removal of continuous rod, continuous tubing, wireline, or cable in the wellbore.

7. The apparatus of claim 4, further comprising:
a display in communication with the at least one load-cell and the at least one or more length sensors and processor over a wired or local wireless connection, and wherein measured loads are presented numerically or graphically on said display, and
additional mesaured or derived values comprising at least one of rate of travel, peak and minimum loads, peak velocity, or equipment counts are presented on said display to a rig operator.

8. The apparatus of claim 7, wherein the processor is configured to alert a user, on the display, if measurement thresholds are exceeded, and
the processor is configured to set thresholds including maximum velocities, maximum vertical positions, minimum vertical positions, arbitrary vertical locations, maximum loads, minimum loads, or an arbitrary distance or length of handled equipment.

9. The apparatus of claim 7, wherein the processor is configured to convey alerts visually on said display, through audio, or by haptic feedback, to a rig operator and said processor is further configured to selectively set a type of alert sent to the rig operator.

10. The apparatus of claim 4, wherein the length sensor comprises a rotary encoder or wheel type counter placed on a rotating component of the continuous rod or tubing injector assembly, or directly on the continuous rod, continuous tubing, wireline, or cable and is configured to;
measure distance of the continuous rod, continuous tubing, wireline or cable as it passes through the injector assembly,
wherein said distance measurement corresponds to the current length of the continuous rod, continuous tubing, wireline, or cable disposed downhole.

11. A method for measuring downhole friction in a wellbore during a workover or wireline procedure, comprising the steps of:

providing a varying length of continuous rod, continuous tubing, wireline, or cable disposed into a wellbore and exposed to downhole mechanical friction to be measured;
measuring, with a sensing device comprising at least one load sensor and at least one distance or length sensor, a plurality of measurements of load and length of the continuous rod, continuous tubing, wireline, or cable disposed downhole, at synchronized points in time,
correlating measured loads and exposed downhole lengths of said continuous rod, continuous tubing, wireline, or cable,
wherein said measuring step further includes gathering said time synchronized measurements as said continuous rod, continuous tubing, wireline, or cable is continually moved down into, or removed from, the wellbore;
providing a processor and;
determining, with said processor, velocity and acceleration of dynamic motion of the continuous rod, continuous tubing, wireline, or cable based on the measurements made by the sensing device by correlating a change in exposed downhole length of the continuous rod, continuous tubing, wireline, or cable over time;
determining, with said processor, loads attributed to friction by eliminating loads attributed to the determined acceleration of a distinct upper finite portion of said continuous rod, continuous tubing, wireline, or cable of the exposed downhole length of the continuous rod, continuous tubing, wireline, or cable;
determining, with said processor, cumulative friction-induced tensile forces acting over the exposed length of continuous rod, continuous tubing, wireline, or cable, moving within the wellbore; and
creating, with said processor, a friction map of the wellbore based on the determined cumulative friction-induced tensile forces acting over the downhole length of exposed continuous rod, continuous tubing, wireline, or cable.

12. The method of claim 11, wherein the sensing device is located on a service rig lifting assembly, a continuous rod or tubing injector, or a wireline/cable drive system configured to carry a load of the continuous rod, continuous tubing, wireline, or cable disposed into the wellbore, and; further including the step of associating a set of time synchronized measurements of load with corresponding measurements of the exposed downhole length of continuous rod, continuous tubing, wireline, or cable, wherein material properties of said continuous rod, continuous tubing, wireline, or cable are known, but downhole friction conditions are not initially known.

13. The method of claim 12, wherein the sensor device includes a plurality of sensors including a load-cell and at least one of an accelerometer, a gyroscope, a barometer, a magnetometer a rotary encoder, wheel type counter, a string potentiometer, a laser distance sensor, a sonic distance sensor, or combinations thereof, and the measurement step comprises reading the load-cell and taking at least one measurement from: the accelerometer, the gyroscope, the barometer, the magnetometer, the rotary encoder, the wheel type counter, the string potentiometer, the laser distance sensor, the sonic distance sensor, or combinations thereof, said plurality of sensors are placed at different locations along the continuous rod, continuous tubing, wireline, or cable, or along the lifting assembly and are configured to provide a combined measure of load and exposed downhole length corresponding to the distinct upper finite portion of the exposed downhole length of continuous rod, continuous tubing, wireline, or cable.

14. The method of claim 13, wherein the measurements of load and length are obtained from the plurality of sensors, each individual sensor placed at independent locations along the service rig lifting assembly, continuous rod injector or continuous tubing injector, or wireline/cable drive system, and wherein each sensor communicates their measurements to the processor, and wherein the processor adjusts measured values from each of the sensors to represent combined measurement of both load and position at the distinct upper finite portion of the exposed downhole length of continuous rod, continuous tubing, wireline, or cable such that load corresponds to a cumulative load below said distinct upper finite portion, and position corresponds to a total length of continuous rod, continuous tubing, wireline, or cable below said distinct upper finite portion; and said measured values are time-synchronized by direct electrical communication between each of the plurality of sensors, or by means of a time-stamped log.

15. The method of claim 14, wherein: handling of continuous rod, continuous tubing, wireline or cable is performed by varying a rate of movement of the length of continuous rod, continuous tubing, wireline, or cable, into or out of the wellbore, and; wherein the processor removes dynamic motion and dynamic loads to reveal friction acting at various depths along the wellbore by comparing the multiple measurements on the varying length of continuous rod, continuous tubing, wireline, or cable as said length changes due to the continued insertion or removal of continuous rod, continuous tubing, wireline, or cable in the wellbore.

16. The method of claim 14, wherein:
handling of continuous rod, tubing, wireline or cable is performed with a constant rate of movement of the length of continuous rod, continuous tubing, wireline, or cable, into or out of the wellbore,
wherein the processor compares the measured load from each of the plurality of sensors placed at different locations with an expected load computed from known material properties, total length, and fluid properties surrounding the continuous rod, continuous tubing, wireline, or cable in the wellbore, and
wherein a difference in measured and expected load, when traveling at a constant rate, corresponds to a cumulative friction acting on the said length of continuous rod, continuous tubing, wireline, or cable, and wherein the processor reveals friction acting at various depths along the wellbore by comparing the measured loads from each of the plurality of sensors on the varying length of continuous rod, continuous tubing, wireline, or cable as said length changes due to the continued insertion or removal of continuous rod, continuous tubing, wireline, or cable in the wellbore.

17. The method of claim 14, further comprising: a display of measurements from each of the plurality of sensors, wherein said each of the plurality of sensors is in communication with the processor and display over a wired or local wireless connection, and wherein measured loads are presented numerically or graphically, and additional measured or derived values comprising at least one of rate of travel, peak and minimum loads, peak velocity, or equipment counts are presented on said display to a rig operator.

18. The method of claim 17, wherein the processor is configured to send alerts to the display if measured or derived values exceed predetermined thresholds; and
the processor is configured to set thresholds comprising at least one of maximum velocities, maximum vertical position, minimum vertical position, arbitrary vertical locations, maximum loads, minimum loads, or an arbitrary distance or total length of continuous rod, continuous tubing, wireline, or cable.

19. The method of claim 18, wherein the alerts are conveyed visually, through audio, or by haptic feedback, to a rig operator and the processor is configured to selectively choose which type of alert to send.

20. The method of claim 14, wherein the plurality of sensors includes a rotary encoder or a wheel type counter for measuring distance wherein said rotary encoder or said wheel type counter is placed on at least one of:
a rotating component of the continuous rod injector assembly; or
a rotating component of the continuous tubing injector assembly; or
a rotating component of the wireline/cable drive system; or
directly on the continuous rod; or
directly on the continuous tubing; or
directly on the wireline, and
is configured to measure a distance of the continuous rod or continuous tubing, wireline, or cable as it passes through the injector assembly,
wherein said distance measurement corresponds to the distinct upper finite portion of continuous rod, continuous tubing, wireline or cable disposed downhole.

\* \* \* \* \*